(12) United States Patent
Manolakos et al.

(10) Patent No.: US 12,425,154 B2
(45) Date of Patent: Sep. 23, 2025

(54) QUASI CO-LOCATION TYPE FOR DOPPLER PRE-COMPENSATED REFERENCE SIGNAL

(71) Applicant: QUALCOMM INCORPORATED, San Diego, CA (US)

(72) Inventors: Alexandros Manolakos, Escondido, CA (US); Muhammad Sayed Khairy Abdelghaffar, San Jose, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 303 days.

(21) Appl. No.: 17/796,458

(22) PCT Filed: Mar. 10, 2021

(86) PCT No.: PCT/US2021/021732
§ 371 (c)(1),
(2) Date: Jul. 29, 2022

(87) PCT Pub. No.: WO2021/183662
PCT Pub. Date: Sep. 16, 2021

(65) Prior Publication Data
US 2023/0344575 A1    Oct. 26, 2023

(30) Foreign Application Priority Data
Mar. 13, 2020  (GR) .............................. 20200100140

(51) Int. Cl.
*H04W 72/04*    (2023.01)
*H04L 5/00*    (2006.01)
(Continued)

(52) U.S. Cl.
CPC ......... *H04L 5/0048* (2013.01); *H04W 56/004* (2013.01)

(58) Field of Classification Search
CPC ............... H04L 5/0048; H04L 25/0228; H04L 25/0204; H04W 56/004; H04B 7/022
(Continued)

(56) References Cited

U.S. PATENT DOCUMENTS

2018/0278438 A1*  9/2018  Jung .................... H04L 5/0053
2018/0316409 A1* 11/2018  Yoon .................... H04L 5/0044
(Continued)

FOREIGN PATENT DOCUMENTS

CN        108111272 A      6/2018
WO    WO-2017196398 A1    11/2017
(Continued)

OTHER PUBLICATIONS

International Search Report and Written Opinion—PCT/US2021/021732—ISA/EPO—Jul. 7, 2021.

*Primary Examiner* — Maharishi V Khirodhar
(74) *Attorney, Agent, or Firm* — Holland & Hart LLP

(57) ABSTRACT

Methods, systems, and devices for wireless communications are described. A base station that may include at least two transmission reception points (TRPs) next to a high speed train (HST) may transmit, to a user equipment (UE) on the HST, an indication of a quasi co-location (QCL) relationship indicating a relationship between a plurality of tracking reference signals (TRSs) and a demodulation reference signal (DMRS) of a data channel. The plurality of TRSs may include a first TRS and a second TRS. The UE may receive, from a first TRP, the first TRS associated with an occasion of the data channel, and receive, from a second TRP, the second TRS associated with the occasion of the data channel. The UE may perform, based on the indication of the QCL relationship, a channel estimation procedure for the data channel based on the DMRS, the received first TRS, and the received second TRS.

29 Claims, 16 Drawing Sheets

(51) Int. Cl.
*H04W 56/00* (2009.01)
*H04W 76/00* (2018.01)
*H04W 88/08* (2009.01)

(58) Field of Classification Search
USPC ........................................................ 370/329
See application file for complete search history.

(56) References Cited

U.S. PATENT DOCUMENTS

2019/0052443 A1* 2/2019 Cheng .................... H04L 5/0048
2019/0165880 A1* 5/2019 Hakola ................. H04L 1/1854
2022/0393809 A1* 12/2022 Gao ...................... H04W 72/21

FOREIGN PATENT DOCUMENTS

WO    WO-2019161181      8/2019
WO    WO-2019235906 A1 * 12/2019 ........... H04L 27/261

* cited by examiner

Doppler spectrum   Doppler spectrum

QUASI CO-LOCATION TYPE FOR DOPPLER PRE-COMPENSATED REFERENCE SIGNAL

CROSS REFERENCE

The present Application is a 371 national stage filing of International PCT Application No. PCT/US2021/021732 by MANOLAKOS et al. entitled "QUASI CO-LOCATION TYPE FOR DOPPLER PRE-COMPENSATED REFERENCE SIGNAL," filed Mar. 10, 2021; and claims priority to Greece Provisional Patent Application No. 20200100140 by MANOLAKOS et al., entitled "QUASI CO-LOCATION TYPE FOR DOPPLER PRE-COMPENSATED REFERENCE SIGNAL," filed Mar. 13, 2020, each of which is assigned to the assignee hereof, and each of which is expressly incorporated by reference in its entirety herein.

FIELD OF TECHNOLOGY

The present disclosure relates generally to wireless communications and more specifically to quasi co-location (QCL) type for Doppler pre-compensated reference signals.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, a dedicated wireless network may be deployed along a transportation platform (e.g., roadway, runway, railway) to serve UEs being transported at a high speed (e.g., such as UEs transported on a high speed train (HST)). In some implementations, HST channel propagation may impose unique challenges such as high Doppler variation (e.g., Doppler shift, Doppler spread, sparse Doppler profiles), high mobility constraints, downgraded channel estimation, etc.

SUMMARY

The described techniques relate to improved methods, systems, devices, and apparatuses that support quasi co-location (QCL) type for Doppler pre-compensated reference signals. Generally the described techniques facilitate enhanced communications between one or more transmission reception points (TRPs) along a transportation platform (e.g., roadway, runway, railway) and a user equipment (UE) on a transportation vehicle (e.g., car, plane, train) traveling at a high speed (e.g., high speed train (HST)). In some implementations, the described techniques support the consideration of reference signals, such as demodulation reference signals (DMRSs) and tracking reference signals (TRSs), and QCL relationships (e.g., assumptions), including, but not limited to, for HST single frequency networks (SFN) (HST-SFN). For example, a base station that may include at least two TRPs that may be evenly spaced along a HST may transmit, to a UE, an indication of a QCL relationship indicating a relationship between a plurality of TRSs and a DMRS of a data channel. The plurality of TRS may include at least a first TRS and a second TRS. The UE may receive the indication and receive, from a first TRP, the TRS associated with an occasion of the data channel, and receive, from a second TRP, the second TRS associated with the occasion of the data channel. The UE may perform, based on the indication of the QCL relationship, a channel estimation procedure for the data channel based on the DMRS, the received first TRS, and the received second TRS.

In another example, the base station may transmit, to a UE on the HST, an indication that the base station may perform pre-compensation of each reference signal (e.g., TRS) from each TRP. In some cases, the pre-compensation may include Doppler shift pre-compensation, or Doppler spread pre-compensation, or a combination thereof for the first TRP and the second TRP. The UE may receive the indication and receive, from a first TRP, a first TRS associated with an occasion of a data channel, and receive, from a second TRP, a second TRS associated with the occasion of the data channel, where the TRSs may be pre-compensated. The UE may perform a channel estimation procedure for the data channel based on the received indication, the received first TRS, and the received second TRS.

A method for wireless communication at a UE is described. The method may include receiving, from a base station, an indication of a QCL relationship indicating a relationship between a set of multiple TRSs and a DMRS of a data channel, the set of multiple TRSs including at least a first TRS and a second TRS, receiving, from a first TRP, the first TRS associated with an occasion of the data channel, receiving, from a second TRP, the second TRS associated with the occasion of the data channel, and performing, based on the indication of the QCL relationship, a channel estimation procedure for the data channel based on the DMRS, the received first TRS, and the received second TRS.

An apparatus for wireless communication at a UE is described. The apparatus may include a processor, memory coupled with the processor, and instructions stored in the memory. The instructions may be executable by the processor to cause the apparatus to receive, from a base station, an indication of a QCL relationship indicating a relationship between a set of multiple TRSs and a DMRS of a data channel, the set of multiple TRSs including at least a first TRS and a second TRS, receive, from a first TRP, the first TRS associated with an occasion of the data channel, receive, from a second TRP, the second TRS associated with the occasion of the data channel, and perform, based on the indication of the QCL relationship, a channel estimation procedure for the data channel based on the DMRS, the received first TRS, and the received second TRS.

Another apparatus for wireless communication at a UE is described. The apparatus may include means for receiving, from a base station, an indication of a QCL relationship indicating a relationship between a set of multiple TRSs and a DMRS of a data channel, the set of multiple TRSs including at least a first TRS and a second TRS, means for receiving, from a first TRP, the first TRS associated with an occasion of the data channel, means for receiving, from a second TRP, the second TRS associated with the occasion of the data channel, and means for performing, based on the indication of the QCL relationship, a channel estimation procedure for the data channel based on the DMRS, the received first TRS, and the received second TRS.

A non-transitory computer-readable medium storing code for wireless communication at a UE is described. The code may include instructions executable by a processor to receive, from a base station, an indication of a QCL relationship indicating a relationship between a set of multiple TRSs and a DMRS of a data channel, the set of multiple TRSs including at least a first TRS and a second TRS, receive, from a first TRP, the first TRS associated with an occasion of the data channel, receive, from a second TRP, the second TRS associated with the occasion of the data channel, and perform, based on the indication of the QCL relationship, a channel estimation procedure for the data channel based on the DMRS, the received first TRS, and the received second TRS.

In some examples of the method, apparatuses, and non-transitory computer-readable medium described herein, the occasion of the data channel may be for an SFN transmission of the data channel that includes the DMRS from the first TRP and the second TRP.

In some examples of the method, apparatuses, and non-transitory computer-readable medium described herein, the indication of the QCL relationship includes an indication of whether the set of multiple TRSs may be pre-compensated by the base station.

In some examples of the method, apparatuses, and non-transitory computer-readable medium described herein, the indicated pre-compensation of the set of multiple TRSs includes a Doppler shift pre-compensation, or a Doppler spread pre-compensation, or both, for the first TRP and the second TRP.

In some examples of the method, apparatuses, and non-transitory computer-readable medium described herein, receiving the indication of the QCL relationship may include operations, features, means, or instructions for receiving the indication in a TRS configuration, the TRS configuration indicating at least a first set of resources for the first TRS and a second set of resources for the second TRS.

In some examples of the method, apparatuses, and non-transitory computer-readable medium described herein, the indication in the TRS configuration includes an information element that indicates whether the set of multiple TRSs may be pre-compensated by the base station.

In some examples of the method, apparatuses, and non-transitory computer-readable medium described herein, the indication of the QCL relationship includes a field that indicates whether the set of multiple TRSs may be pre-compensated by the base station.

Some examples of the method, apparatuses, and non-transitory computer-readable medium described herein may further include operations, features, means, or instructions for determining, based on the received first TRS, a first Doppler shift value or a first Doppler spread value, or both, associated with the first TRP, determining, based on the received second TRS, a second Doppler shift value or a second Doppler spread value, or both, associated with the second TRP, and transmitting, to the base station, a report indicating the first Doppler shift value and the second Doppler shift value, or the first Doppler spread value and the second Doppler spread value, or both.

In some examples of the method, apparatuses, and non-transitory computer-readable medium described herein, the QCL relationship includes an indication that a Doppler shift between the DMRS and the set of multiple TRSs may be within a first threshold value, or the QCL relationship includes an indication that a Doppler spread between the DMRS and the set of multiple TRSs may be within a second threshold value, or both.

In some examples of the method, apparatuses, and non-transitory computer-readable medium described herein, the QCL relationship further includes the Doppler shift, the Doppler spread, an average delay, and a delay spread.

Some examples of the method, apparatuses, and non-transitory computer-readable medium described herein may further include operations, features, means, or instructions for receiving, in the occasion of the data channel, the DMRS and a data signal and decoding the received data signal based on the performing of the channel estimation procedure.

Some examples of the method, apparatuses, and non-transitory computer-readable medium described herein may further include operations, features, means, or instructions for determining a Doppler shift value, or a Doppler spread value, or both, between the received first TRS and the received second TRS and reporting the determined Doppler shift value, or the Doppler spread value, or both, to the base station.

Some examples of the method, apparatuses, and non-transitory computer-readable medium described herein may further include operations, features, means, or instructions for identifying that the determined Doppler shift value exceeds a first threshold, or the determined Doppler spread value exceeds a second threshold, or both, where the determined Doppler shift value may be reported to the base station based on the determined Doppler shift value exceeding the first threshold, or the determined Doppler spread value may be reported to the base station based on the determined Doppler spread value exceeding the second threshold, or both.

In some examples of the method, apparatuses, and non-transitory computer-readable medium described herein, the first TRP and the second TRP may be associated with one layer of the data channel, and the DMRS of the data channel includes one DMRS port.

A method for wireless communication at a base station is described. The method may include transmitting, to a UE, an indication of a QCL relationship indicating a relationship between a set of multiple TRSs and a DMRS of a data channel, the set of multiple TRSs including at least a first TRS and a second TRS, transmitting, from a first TRP of the base station, the first TRS and the DMRS of the data channel, and transmitting, from a second TRP of the base station, the second TRS and the DMRS of the data channel.

An apparatus for wireless communication at a base station is described. The apparatus may include a processor, memory coupled with the processor, and instructions stored in the memory. The instructions may be executable by the processor to cause the apparatus to transmit, to a UE, an indication of a QCL relationship indicating a relationship between a set of multiple TRSs and a DMRS of a data channel, the set of multiple TRSs including at least a first TRS and a second TRS, transmit, from a first TRP of the base station, the first TRS and the DMRS of the data channel, and transmit, from a second TRP of the base station, the second TRS and the DMRS of the data channel.

Another apparatus for wireless communication at a base station is described. The apparatus may include means for transmitting, to a UE, an indication of a QCL relationship indicating a relationship between a set of multiple TRSs and a DMRS of a data channel, the set of multiple TRSs including at least a first TRS and a second TRS, means for transmitting, from a first TRP of the base station, the first TRS and the DMRS of the data channel, and means for transmitting, from a second TRP of the base station, the second TRS and the DMRS of the data channel.

A non-transitory computer-readable medium storing code for wireless communication at a base station is described. The code may include instructions executable by a processor to transmit, to a UE, an indication of a QCL relationship indicating a relationship between a set of multiple TRSs and a DMRS of a data channel, the set of multiple TRSs including at least a first TRS and a second TRS, transmit, from a first TRP of the base station, the first TRS and the DMRS of the data channel, and transmit, from a second TRP of the base station, the second TRS and the DMRS of the data channel.

In some examples of the method, apparatuses, and non-transitory computer-readable medium described herein, the DMRS may be transmitted as an SFN transmission from the first TRP and the second TRP.

Some examples of the method, apparatuses, and non-transitory computer-readable medium described herein may further include operations, features, means, or instructions for transmitting a data signal on an occasion of the data channel as an SFN transmission from the first TRP and the second TRP.

In some examples of the method, apparatuses, and non-transitory computer-readable medium described herein, the indication of the QCL relationship includes an indication of whether the set of multiple TRSs may be pre-compensated by the base station.

In some examples of the method, apparatuses, and non-transitory computer-readable medium described herein, the indicated pre-compensation of the set of multiple TRSs includes a Doppler shift pre-compensation, or a Doppler spread pre-compensation, or both, for the first TRP and the second TRP.

In some examples of the method, apparatuses, and non-transitory computer-readable medium described herein, transmitting the indication of the QCL relationship may include operations, features, means, or instructions for transmitting the indication in a TRS configuration, the TRS configuration indicating at least a first set of resources for the first TRS and a second set of resources for the second TRS.

Some examples of the method, apparatuses, and non-transitory computer-readable medium described herein may further include operations, features, means, or instructions for receiving, from the UE, a report indicating a Doppler shift value or a Doppler spread value, or both, between the first TRS and the second TRS.

Some examples of the method, apparatuses, and non-transitory computer-readable medium described herein may further include operations, features, means, or instructions for transmitting, to the UE, a configuration for the UE to use to receive the set of multiple TRSs from a set of multiple TRPs, including at least the first TRP and the second TRP.

In some examples of the method, apparatuses, and non-transitory computer-readable medium described herein, the first TRP and the second TRP may be associated one single layer of the data channel and the DMRS of the data channel includes one DMRS port.

DETAILED DESCRIPTION

Figure 1:
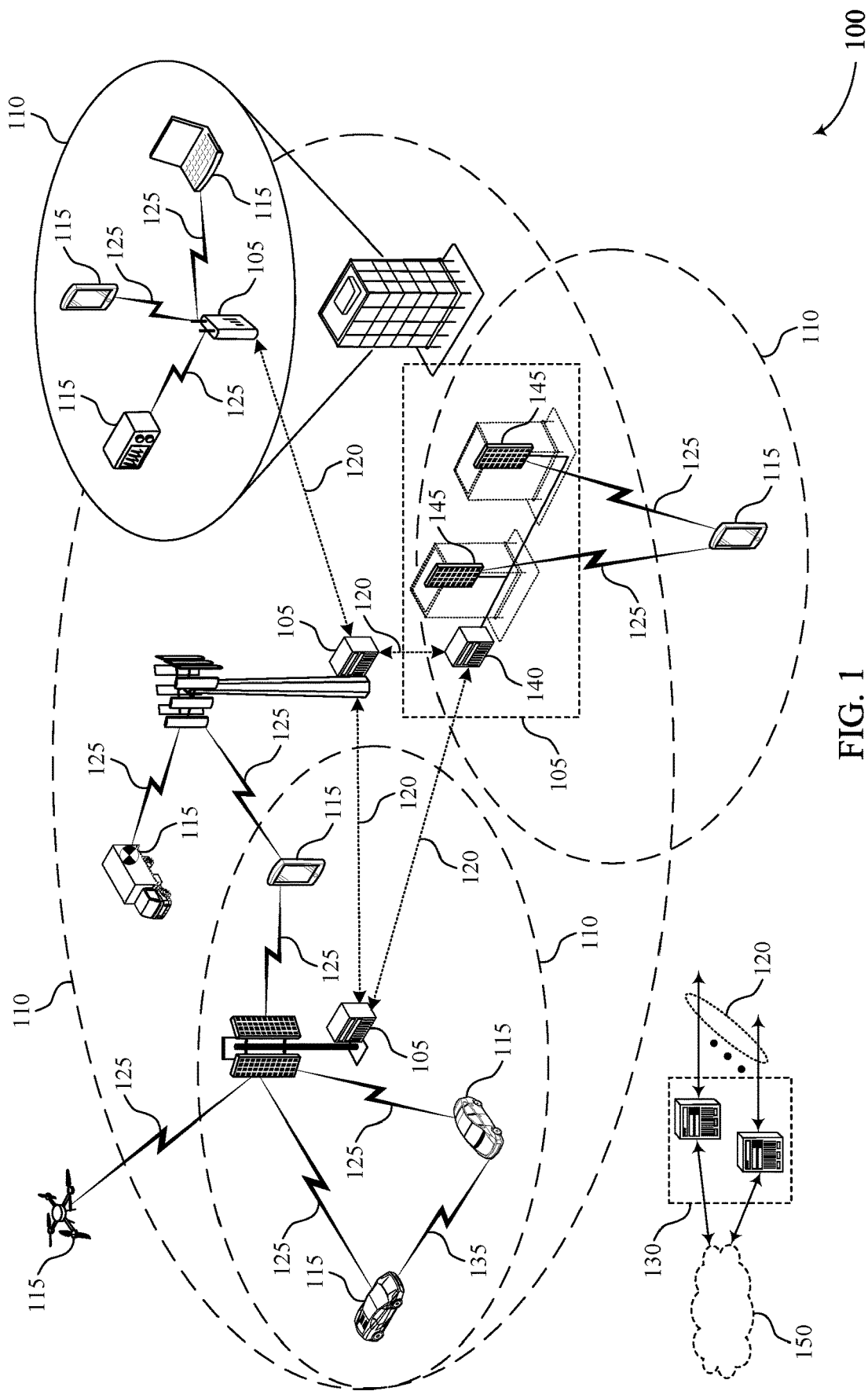
FIG. 1 illustrates an example of a system for wireless communications that supports quasi co-location (QCL) type for Doppler pre-compensated reference signals in accordance with aspects of the present disclosure.

Some wireless communication systems, such as fifth generation (5G) systems which may be referred to as New Radio (NR) systems, may be configured to support communications on a high speed vehicle (e.g., a high speed train (HST)). For example, a user equipment (UE) on a HST may be configured to receive communications from one or more transmission reception points (TRPs) along the railway, where the TRPs may be spaced evenly or similarly along the track. In some cases, the UE and TRPs may communicate via a single frequency network (SFN) (e.g., a broadcast network) such that each TRP may simultaneously transmit the same signal over the same frequency channel to the UE.

The UE on an HST may travel between two TRPs and the two TRPs may transmit a joint SFN reference signal to the UE so that the UE may estimate aspects of a radio channel between the TRPs and UE based on the measured reference signal. In some implementations, a UE may use quasi co-location (QCL) assumptions to perform channel estimations. For example, QCL may enable a wireless device to make some assumptions or determinations about the relationships between different radio channels associated with different downlink transmissions received at different antenna ports. The wireless device may use QCL assumptions between two or more antenna ports to perform channel estimation for those antenna ports. This helps the wireless device determine which reference signals should be used for channel estimation for different downlink transmissions or to determine relevant channel state information (CSI), among other operations. As such, the UE may receive the same reference signal from multiple TRPs and use QCL assumptions to determine downlink channel (e.g., physical downlink shared channel (PDSCH)) conditions (e.g., channel quality indicator (CQI), reference signal received power (RSRP), reference signal received quality (RSRQ), signal-to-interference-plus-noise ratio (SINR), rank indicator (RI)).

The SFN reference signal transmissions from the multiple TRPs may result in the UE receiving echoes of the same reference signal, where the echoes may cause interference with one another which may adversely impact channel estimation. To mitigate reference signal interference, the TRPs may be configured to receive multiple QCL assumptions for a single UE demodulation reference signal (DMRS) port such that TRPs along the HST may transmit different reference signals to a UE, where the reference signals are transmitted on different DMRS ports and according to different transmission configuration indicator (TCI) states. The UE that receives the two different reference signals may more accurately estimate the channel conditions (e.g., PDSCH conditions) because the different reference signals may not cause interference with one another. In some cases, a UE may receive a first reference from a first TRP and a second reference signal from a second TRP. The UE may determine that the two received reference signals have two different Doppler variations, such as Doppler shift, Doppler spread, delay, etc. which may result in increased complexity for the UE to determine channel conditions.

To decrease the complexity of channel estimation and improve efficiency at the UE, the first and second TRPs may separately Doppler pre-compensate the first and second reference signals, respectively to account for the different Doppler variations between the two reference signals. The separate Doppler pre-compensation may permit the UE to more accurately determine channel conditions and to estimate Doppler shifts and/or spreads for future communications with the first and second TRPs. The Doppler pre-compensation may improve the UEs ability to assess appropriate frequency offsets for downlink channel estimation on the DMRS ports.

In some implementations, the first and second TRPs may indicate whether pre-compensation is configured via higher layer signaling to the UE prior to transmitting the pre-compensated reference signals to the UE. In some cases, the UE may receive the pre-compensated reference signals from the two TRPs and estimate the Doppler shift and/or spread experienced between each TRP. The UE may feedback the Doppler shift and/or spread estimation to each TRP that each TRP may use to further improve the Doppler pre-compensation.

Particular aspects of the subject matter described herein may be implemented to realize one or more advantages. The described techniques may support improvements in a network, including SFN networks (e.g., a HST-SFN network), with multiple TRPs by mitigating interference between reference signals, and improving channel estimation, among other advantages. As such, supported techniques may include improved network operations and, in some examples, may promote network efficiencies, among other benefits.

Aspects of the disclosure are initially described in the context of wireless communications systems. Aspects are then described with respect to a Doppler pre-compensation procedure and a process flow. Aspects of the disclosure are further illustrated by and described with reference to apparatus diagrams, system diagrams, and flowcharts that relate to QCL type for Doppler pre-compensated reference signals.

FIG. 1 illustrates an example of a wireless communications system 100 that supports QCL type for Doppler pre-compensated reference signals in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some implementations, the described techniques support the consideration of reference signals, such as DMRSs and tracking reference signals (TRSs), and QCL relationships (e.g., assumptions), including, but not limited to, for HST SFN (HST-SFN). For example, a base station 105 that may include at least two TRPs 145 (TRPs) that may be evenly spaced along a HST may transmit, to a UE 115 on the HST, an indication that the base station 150 may perform pre-compensation of reference signals (e.g., TRSs). In some cases, the pre-compensation may include Doppler shift pre-compensation, or Doppler spread pre-compensation, or a combination thereof for the first TRP 145 and the second TRP 145. The UE 115 may receive the indication and receive, from a first TRP 145, a first TRS associated with an occasion of a data channel, and receive, from a second TRP 145, a second TRS associated with the occasion of the data channel. The UE 115 may perform a channel estimation procedure for the data channel based on the received indication, the received first TRS, and the received second TRS.

Figure 2:
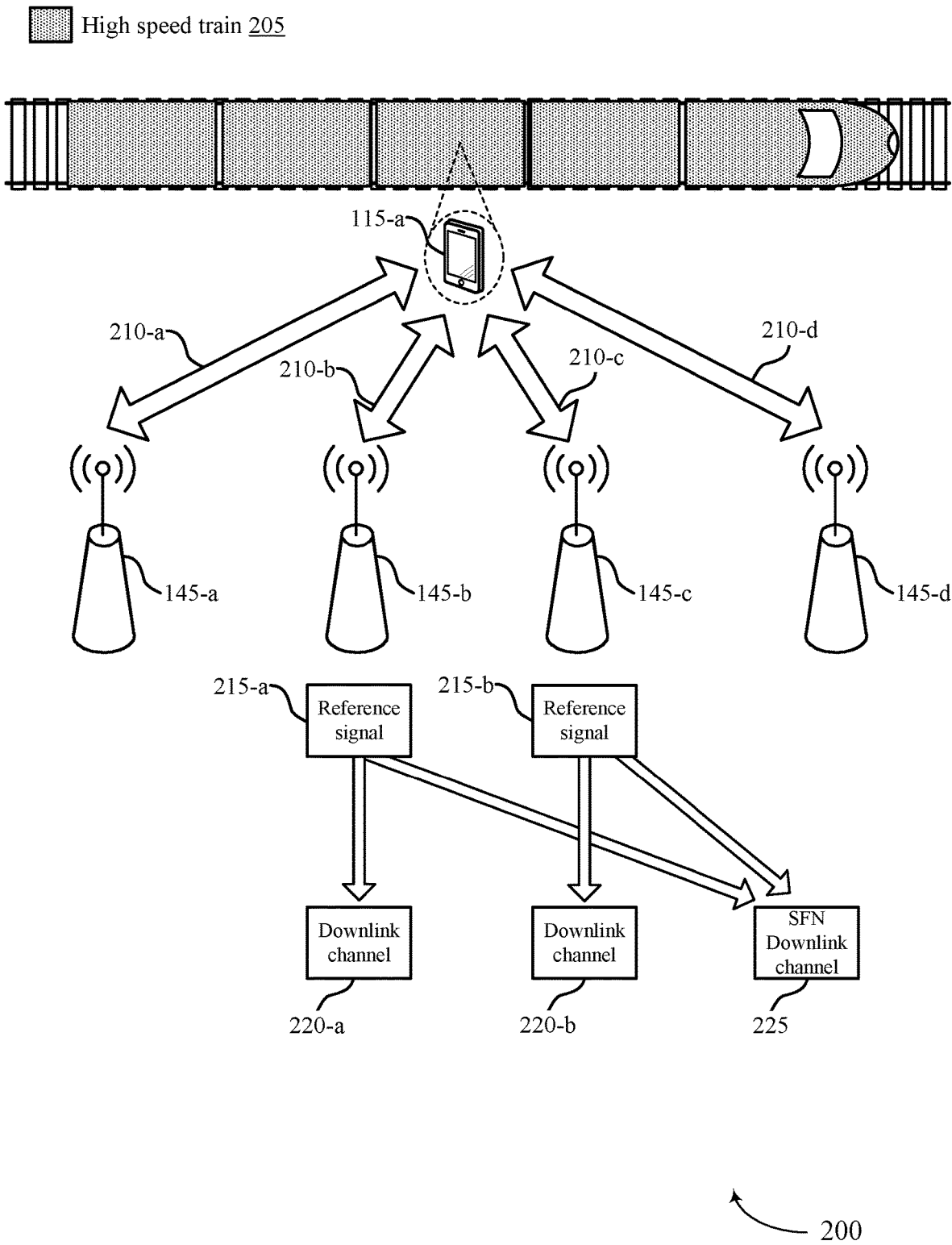
FIG. 2 illustrates an example of a system for wireless communications that supports QCL type for Doppler pre-compensated reference signals in accordance with aspects of the present disclosure.

FIG. 2 illustrates an example of a wireless communications system 200 that supports QCL type for Doppler pre-compensated reference signals in accordance with aspects of the present disclosure. The wireless communications system 200 may include TRPs 145-a, 145-b, 145-c, and 145-d, that are associated with one or more base stations, and UE 115-a, which may be examples of a base station and a UE 115 as described with reference to FIG. 1. In some cases, a TRP may be referred to as a remote radio head (RRH). UE 115-a may be on an HST 205 and TRPs 145-a, 145-b, 145-c, and 145-d may operate in an SFN to communicate with the moving UE 115. The HST 205 may carry any number of UEs 115 and the SFN may serve a portion or all of the UEs 115 on the HST 205. TRPs 145-a, 145-b, 145-c, and 145-d may serve the same geographic coverage area, or different geographic coverage areas. In some cases, TRPs 145-a, 145-b, 145-c, and 145-d may implement a Doppler pre-compensation procedure. For example, TRPs 145-a, 145-b, 145-c, and 145-d may individually pre-compensate reference signals associated with each TRP 145 prior to transmitting the reference signals to UE 115-a over communication links 210-a, 210-b, 210-c, and 210-d to account for Doppler variations that may be caused by high speed movement. Additionally or alternatively, other wireless devices, such as UE 115-a may implement a Doppler pre-compensation procedure.

Some wireless communication systems, such as fifth generation (5G) systems which may be referred to as New Radio (NR) systems, may be designed or configured to efficiently perform downlink multiantenna transmissions. In downlink multiantenna transmissions, multiple wireless devices, such as TRPs 145, may concurrently or simultaneously transmit downlink information to a network node, such as a UE 115. To properly interpret received transmissions, a wireless device may need to know one or more properties of a channel over which the one or more transmissions were made. A UE 115, TRP 145, or other wireless devices may estimate aspects of a radio channel based on one or more reference signals transmitted over the radio channel between the wireless devices. The channel estimations may assist the wireless device in interpreting received downlink transmissions and relevant CSI, among other examples. Techniques described herein may provide improved channel estimation for downlink multiantenna transmissions, including in relatively high speed scenarios using the concept of QCL.

QCL, in some examples, may assist a UE 115 in performing channel estimation, among other operations. QCL may enable a UE 115 to make some assumptions or determinations about the relationships between different radio channels associated with different downlink transmissions received at different antenna ports. The UE 115 may use QCL assumptions between two or more antenna ports to perform channel estimation for those antenna ports. The QCL assumptions may aid the UE 115 in determining which reference signals should be used for channel estimation for different downlink transmissions or to determine relevant CSI, among other operations. In some cases, a base station or a TRP 145 may signal QCL assumptions to a UE 115. The UE 115 may receive the QCL information in radio resource control (RRC) signaling and may be signaled through an individual information element. A first QCL assumption (e.g., QCL-TypeA) may indicate a Doppler shift, Doppler spread, average delay, and delay spread. A second QCL assumption (e.g., QCL-TypeB) may indicate a Doppler shift, and Doppler spread. A third QCL assumption (e.g., QCL-TypeC) may indicate a Doppler shift and average delay. A fourth QCL assumption (e.g., QCL-TypeD) may indicate a spatial reception parameter. In some implementations, a UE 115 may assume that a reference signal (e.g., non-zero power CSI reference signal (CSI-RS)) and a DMRS are QCLed. The UE 115 may determine large scale properties of a downlink channel (e.g., PDSCH, physical downlink control channel (PDCCH)) through which a DMRS is transmitted based on the CSI-RS.

In some multi-TRP deployments, two or more TRPs 145 may communicate reference signals (e.g., TRSs, phase-TRS (PTRS)) to a UE 115. For example, a UE on a HST may receive reference signals from two TRPs 145 as the UE 115 moves between the TRPs. The UE 115 may use the reference signals to determine channel conditions (e.g., CQI, RSRP, RSRQ, SINR, RI) for downlink transmissions. In some networks, two or more of the TRPs 145 may concurrently or simultaneously send the same reference signal (e.g., a joint SFN reference signal) using the same frequency to the UE 115. These concurrent or nearly simultaneous, same frequency reference signals may be referred to as SFN reference signals. The SFN reference signals may be nearly simultaneous transmissions from multiple geographically separated antennas. To the UE receiving these SFN reference signals, the signals may appear as if the UE were receiving a single reference signal.

In addition to the SFNed reference signals, at least one of the TRPs may send a separate, independent reference signal to the UE 115. The UE 115 may use these one or more independent reference signals to perform channel estimation for the specific antenna ports that received the independent reference signals, but also to interpret the channel estimation for the SFNed reference signals. These techniques may apply, among other examples, to a single-port DMRS used for a PDSCH or a PDCCH. In some cases, TRSs may be an extension to DMRS that may track phase variations across a transmission duration (e.g., slot, subframe, symbol). The TRS may track phase noise. Using information, such as TCI information that may indicate QCL relationships between downlink reference signals (e.g., CSI-RSs) and the downlink channel DMRS port, may allow the UE 115 to perform channel estimation for the radio channels over which it received the SFNed reference signal and the independent reference signal.

The techniques described herein may apply to high speed scenarios, such as HST-SFNs. It is noted that while various examples provided herein are discussed for a UE 115 in an HST environment, such techniques may be used for any type of communications link where a UE 115 is traveling at relative to (e.g., at a high speed relative to) a TRP 145 or group of TRPs 145. For example, a HST 205 dedicated wireless network may include a set of TRPs 145 spaced along a high speed railway and, in some cases, the TRPs 145 (e.g., any number of TRPs 145) may be spaced apart evenly such that there is an equal or similar distance between each TRP 145. A UE may connect to some number (e.g., 4) nearest TRPs 145 that may share the same cell ID.

In some cases, the high speed of travel (e.g., via the HST 205) of the UE (e.g., UE 115-a) and communicating on an SFN network may cause communication challenges including high Doppler variation, path delays, and difficulty in efficiently estimating channel conditions. In some cases, a UE 115 on a HST may experience different Doppler variations and path delays at different locations along the railway. Doppler variations (e.g., Doppler shift, Doppler spread, path delays) may result when a transmitter, or a receiver, or both are moving in relation to one another. The relative movement may shift and/or spread the frequency of the signal, making the frequency of the signal different at the receiver than at the transmitter. As such, the frequency perceived by the receiver may differ from the frequency at which the signal was originally transmitted. For example, UE 115-a may receive reference signals (e.g., a joint SFNed reference signal) via TRPs 145-b and 145-c in an SFN network while UE 115-a moves at a high speed in the direction of TRP 145-c and in the opposite direction of TRP 145-d. The reference signals received by UE 115-a from the two TRPs 145 may experience Doppler shift, or Doppler spread, or both where the Doppler shift and spread of the two reference signals may be different. In some cases, the Doppler shift may be equal and opposite.

In some cases, the joint SFNed reference signal may result in poor channel estimation because the joint reference signal is transmitted using the same TCI state and QCL assumption such that the two same joint reference signal received by the UE may cause interference with one another, resulting in poor channel estimation. Accordingly, devices connected to HST-dedicated wireless networks (e.g., UEs 115 on the HST) may employ configurations to mitigate these challenges.

To support enhanced wireless communications for devices traveling at high speed, a UE 115 may receive multiple QCL assumptions for a single UE DMRS port. In some cases, TRPs 145 evenly spaced beside the HST may be configured to transmit separate reference signals to a UE 115 where the reference signals are transmitted on different DMRS ports according to different TCI states. The UE 115 that receives the two different reference signals may more accurately estimate the channel conditions (e.g., PDSCH conditions) because the different reference signals may not cause interference with one another. For example, TRP 145-b and 145-c may each be associated with a different reference signal, such as reference signals 215-a and 215-b, respectively. A UE 115 connected to TRP 145-b that may not be on the HST may receive reference signal 215-a and use it to estimate downlink channel properties of a channel specific to that UE 115 and TRP 145, such as downlink channel 220-a. Similarly, a UE 115 connected to TRP 145-c that may not be on the HST may receive reference signal 215-b and use it to estimate downlink channel properties of a channel specific to that UE 115 and TRP 145, such as downlink channel 220-b. UE 115-a, that is on the HST, may receive a first reference signal 215-a from TRP 145-b over communication link 210-b and a second reference signal 215-b from TRP 145-c while UE 115-a moves between the two TRPs 145, where reference signals 215-a and 215-b are not a joint SFN reference signal 215. UE 115-a may estimate channel properties of a downlink channel on the SFN (e.g., an SFN PDSCH, SFN PDCCH), such as SFN downlink channel 225 based on received reference signals 215-a and 215-b.

Due to the high speed travel, UE 115-a may determine that the two received reference signals 215 have two different Doppler variations, such as Doppler shift, Doppler spread, delay, etc. which may result in increased complexity for the UE to determine channel conditions. To mitigate the channel estimation complexity at UE 115-a, TRPs 145-b and 145-c may separately Doppler pre-compensate the reference signals 215-a, and 215-b, respectively to account for the different Doppler variations between the two reference signals 215. The separate Doppler pre-compensation may permit UE 115-a to more accurately determine downlink channel conditions and to estimate Doppler shifts and/or spreads for future communications with the TRPs on the SFN. In some cases, TRPs 145 may indicate a pre-compensation configuration to the UE 115 prior to transmitting the pre-compensated reference signals 215 to the UE 115.

Figure 3:
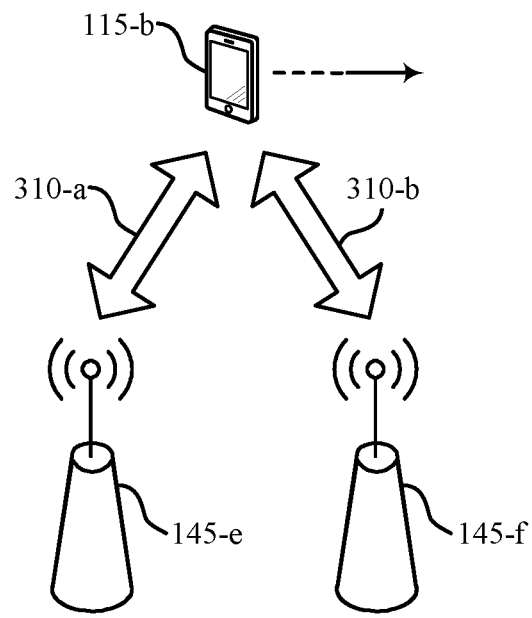
FIG. 3 illustrates an example of a Doppler pre-compensation procedure that supports QCL type for Doppler pre-compensated reference signals in accordance with aspects of the present disclosure.
Figure 3:
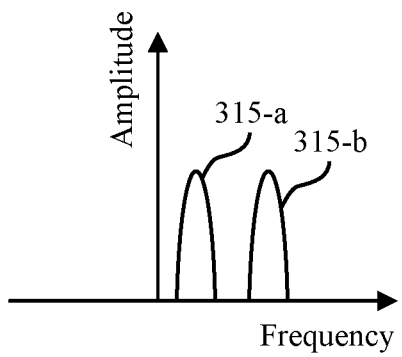
Figure 3:
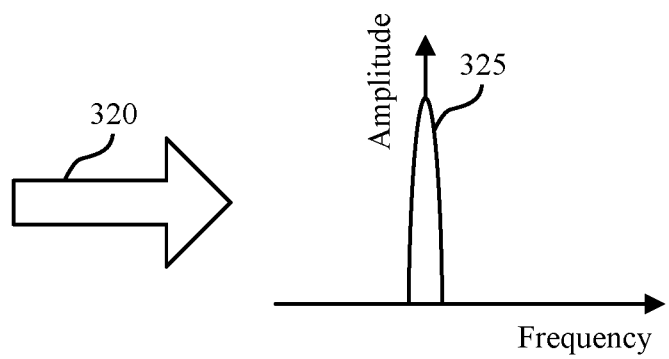

FIG. 3 illustrates an example of a Doppler pre-compensation procedure 300 that supports QCL type for Doppler pre-compensated reference signals in accordance with aspects of the present disclosure. The Doppler pre-compensation procedure 300 may be performed by TRPs 145-e, and 145-f, that are associated with one or more base stations, and UE 115-b which may be examples of a base station and a UE 115 as described with reference to FIGS. 1 and 2. UE 115-b may be moving at high speeds and TRPs 145-e, and 145-f may operate in an SFN to communicate with the moving UE 115. TRPs 145-e and 145-f may serve the same geographic coverage area, or different geographic coverage areas. In some cases, TRPs 145-e, and 145-f may implement a Doppler pre-compensation procedure. For example, TRPs 145-e, and 145-f may individually pre-compensate reference signals associated with each TRP 145 prior to transmitting the reference signals to UE 115-b to account for Doppler variations that may be caused by high speed movement. Additionally or alternatively, other wireless devices, such as UE 115-b may implement a Doppler pre-compensation procedure.

As described herein, TRPs 145 in a SFN may be configured to transmit individual reference signals to a UE 115 on a HST, where a DMRS port may be associated with more than one TCI state. For example, UE 115-b may be on a HST traveling toward TRP 145-f and away from TRP 145-e. TRP-e may transmit a reference signal (e.g., a TRS) to UE 115-b over communication link 310-a and TRP 145-f may transmit a reference signal (e.g., a TRS) to UE 115-b over communication link 310-b, where the reference signals transmitted by each TRP 145 are different. In some cases, the TRPs 145 may transmit the reference signals at the same time. UE 115-b may separately estimate frequency offsets for the two TRPs 145 based on the two received reference signals. Based on the two estimated frequency offsets, UE 115-b may calculate a more accurate frequency offset to be used for compensation (e.g., of Doppler shift and/or spread) during channel estimation on the DMRS port. In some cases, UE 115-a may calculate a frequency offset per channel, and perform an optimized estimation of the Doppler parameters on a Doppler profile (e.g., sparse Doppler profile).

Due to travelling at a high speed, the UE 115 may simultaneously experience two significant and opposite Doppler shifts. For example, the Doppler shift relative to TRP 145-*f* may be a positive Doppler shift of frequency (+$f_d$) and the Doppler shift relative to TRP 145-*e* may be a negative Doppler shift of frequency (−$f_d$). As described herein, the downlink channel and DMRS may be transmitted from coordinated TRPs 145 in an SFN manner while the TRSs from each TRP 145 may be transmitted independently from each TRP 145. As such, the UE 115 may experience a composite and sparse Doppler profile for the DMRS. In some cases, the UE 115 may estimate the Doppler shift from the independent TRSs.

In some implementations, the different Doppler shifts and/or spreads experienced by the UE 115 for each TRS may result in complex channel estimation calculation. To mitigate the complexity, each TRP 145 may Doppler shift and/or spread pre-compensate 320 the TRSs. For example, without Doppler shift pre-compensation 320, UE 115-*b* may receive two separate TRSs and measure a different frequency offset for each TRS, frequency offset 315-*a* and 315-*b*. If the two TRPs 145 instead perform Doppler shift pre-compensation 320 on each TRSs prior to transmission, UE 115-*b* may still receive two separate TRSs and measure the frequency offset from each TRSs. However, with pre-compensation 320, the frequency offset for the two TRSs may be the same, such as frequency offset 325-*a*. In some cases, the TRPs 145 may pre-compensate the TRSs such that the frequency offset is centered around zero in relation to Doppler frequency shift. In some cases, the Doppler shift experienced by the UE 115 may be within a range (e.g., [−x, x], where x may be less than 100 Hz).

TRPs 145 may indicate whether pre-compensation is applied to a TRSs to the UE 115 prior to transmitting the pre-compensated reference signals 215 to the UE 115 to aid with channel estimation. In some cases, the indication may include a pre-compensation configuration such as the range of the pre-compensated Doppler shift. In some cases, the UE 115 may be preconfigured with the range of the pre-compensated Doppler shift. The Doppler pre-compensation indication may be communicated to the UE 115 in one or more ways. In some examples, the Doppler pre-compensation information may be transmitted via higher layer signaling (e.g., higher than physical (PHY) or medium access control (MAC) layer signaling, such as RRC signaling). In some cases, the indication may be included in a TRS configuration of RRC signaling. In some cases, the TRS may be configured as a CSI-RS resource set. A TRS information element (IE) may indicate whether the ports are Doppler shift and/or Doppler spread pre-compensated. Additionally or alternatively, the indication of whether the ports are pre-compensated may be included in the TCI state configuration of RRC signaling. In some cases, the TCI state configuration or the RRC configuration may include an additional field to indicate whether the Doppler shift is pre-compensated (e.g., DopplerShift_Compensation field) and/or the Doppler spread is pre-compensated.

In some implementations, the UE 115 may send an estimate of the actual experienced Doppler shift or Doppler spectrum, or both from each independent reference signal 215 and report it back to each independent TRP 145 in a report (e.g., CSI report). In some cases, each TRP 145 may use the feedback to further adjust the Doppler pre-compensation parameters for subsequent communications with the UE 115. The report transmitted by the UE 115 may include how much Doppler shift the UE 115 experiences. In some cases, the report may indicate whether the UE 115 experienced more than one Doppler shift, or whether the UE 115 experience just one Doppler shift. If the UE 115 experiences and reports two or more Doppler shifts and/or spreads, the UE 115 may report the shift and/or spread of the first TRS, and the frequency difference between the first and second Doppler shifts and/or spreads associated with the two TRSs.

Alternatively or additionally, the UE 115 may report the difference between the experienced Doppler shifts and/or spreads from the received TRSs, which individually may or may not be Doppler shift and/or spread pre-compensated, to aid in future channel estimation. In some examples, the UE 115 may report the difference in experienced Doppler shift and/or spread from the received TRSs if the difference between the two shifts and/or spreads is above a specified threshold. In some cases, the threshold may be used as an upper bound on when the UE 115 is epee ted to meet performance requirements. The UE 115 may report a threshold capability to the TRPs 145.

If a TRS port is Doppler pre-compensated, a UE 115 may be configured with a QCL assumption (e.g., a QCL-TypeE, or another designation of QCL type beyond QCL types A, B, C, and D). The QCL assumption may indicate Doppler shift, Doppler spread, delay shift, and delay spread, and may indicate that the Doppler shift, or Doppler spread or both are expected to be within a range. The QCL assumption may indicate the range, or the UE 115 may be preconfigured with the range. In some cases, the QCL assumption may indicate that the Doppler shift, or Doppler spread, or both is low.

In some implementations, the QCL assumption of DMRS for each indication TRP and TRS may be of two QCL types (e.g., QCL Type A or QCL-Type E), such that the QCL assumption may indicate to the UE 115 whether pre-compensation is applied to each reference signal. For example, UE 115-*a* may receive QCL-Type A for the TRS from TRP 145-*e* and QCL-Type A for TRP 145-*f*, such that neither of the TRSs may be pre-compensated. Additionally or alternatively, UE 115-*a* may receive QCL-Type A for the TRS from TRP 145-*e* and QCL-Type E for TRP 145-*f*, such that the TRS transmitted from TRP 145-*e* may not be pre-compensated but the TRS from TRP 145-*f* may be pre-compensated. Additionally or alternatively, UE 115-*a* may receive QCL-Type E for the TRS from TRP 145-*e* and QCL-Type A for TRP 145-*f*, such that the TRS transmitted from TRP 145-*e* may be pre-compensated and the TRS from TRP 145-*f* may not be pre-compensated. Additionally or alternatively, UE 115-*a* may receive QCL-Type E for the TRS from TRP 145-*e* and TRP 145-*f*, such that both TRSs transmitted from TRP 145-*e* and TRP 145-*f* may be pre-compensated.

In some implementations, a UE 115 may indicate the QCL types, and combinations the UE 115 supports. In some cases, the baseline configuration that the UE 115 may support is QCL-Type A for each TRS from each TRP 145. In some cases, the UE 115 may indicate to the TRPs 145 that it supports a different capability. For example, UE 115-*b* may indicate to the TRPs 145 that UE 115-*a* supports a first capability (e.g., Cap 1) such that it supports QCL-Type A for one TRS and QCL-Type E from another TRS. Additionally or alternatively, UE 115-*b* may indicate to the TRPs 145 that UE 115-*b* supports a second capability (e.g., Cap 2) such that it supports a combination of QCL-Types for the TRSs (e.g., QCL-Type A+E), and the same QCL-types for the TRSs (e.g., QCL-Type E+E). A QCL-Type E may be configured in a first TRS (e.g., TRS1) if it is a QCL source for a downlink channel (e.g., PDSCH) which also has a second TRS, (e.g., TRS2) as a QCL source that may be QCL-Type A or E. QCL-Type E may be scheduled for a downlink channel (e.g., PDSCH) when there are two TRS sources.

In other examples, different QCL type combinations may be supported and indicated. For example, QCL-Type B and QCL-Type E, or QCL-Type C and QCL-Type E, QCL-Type D and QCL-Type E may be indicated to a UE 115. Similarly, different QCL type combinations may be indicated by the UE 115 to base station 105 as supported by UE 115. For example, QCL-Type B and QCL-Type E, or QCL-Type C and QCL-Type E, QCL-Type D and QCL-Type E may be indicated by UE 115 as a supported capability.

Figure 4:
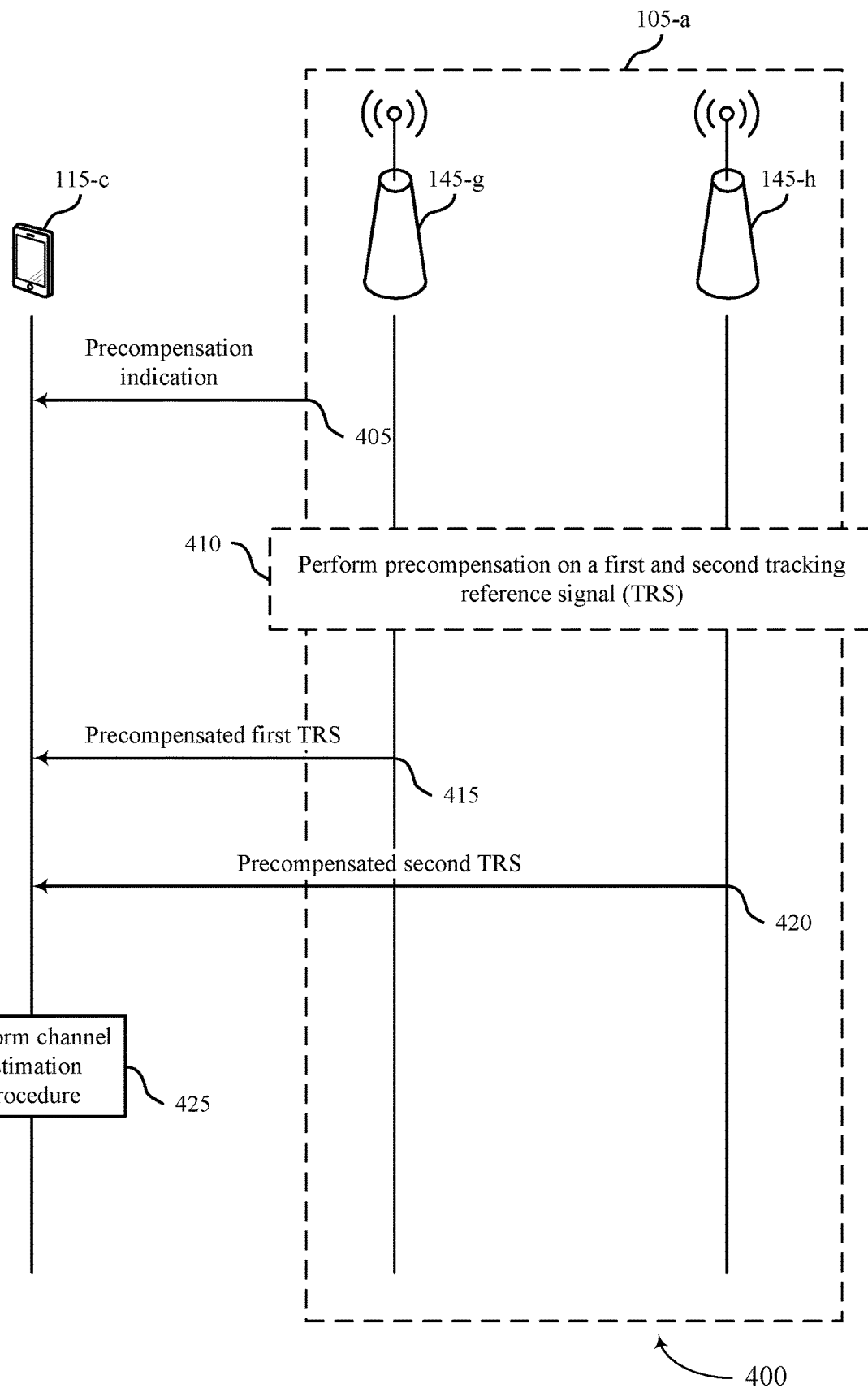
FIG. 4 illustrates an example of a process flow that supports QCL type for Doppler pre-compensated reference signals in accordance with aspects of the present disclosure.

FIG. 4 illustrates an example of a process flow 400 that supports QCL type for Doppler pre-compensated reference signals in accordance with aspects of the present disclosure. For example, base station 105-a may include TRPs 145-g and 145-h that may pre-compensate reference signals transmitted to UE 115-c. Base station 105-a, TRPs 145-g and 145-h, and UE 115-c may be examples of the corresponding wireless devices described with reference to FIGS. 1 through 3. In some cases, instead of base station 105-a and TRPs 145-g and 145-h implementing the reference signal pre-compensation procedure, a different type of wireless device (e.g., a UE 115) may perform the procedure. Alternative examples of the following may be implemented, where some steps are performed in a different order than described or are not performed at all. In some cases, steps may include additional features not mentioned below, or further steps may be added.

At 405, UE 115-c may receive, from base station 150-a, an indication of a QCL relationship indicating a relationship between a plurality of TRSs and a DMRS of a data channel, the plurality of TRSs including at least a first TRS and a second TRS. In some cases, the indicated pre-compensation of the TRSs includes a Doppler shift pre-compensation, Doppler spread pre-compensation, or a combination thereof for the first TRP and the second TRP.

In some cases, at 410, base station 105-a may optionally perform pre-compensation on a first TRS associated with an occasion of a data channel and a second TRS associated with the occasion of the data channel. In some cases, the occasion of the data channel may be an SFN transmission from the first TRP and the second TRP. In some cases, UE 115-a may receive the indication in a TRS configuration, where the indication may include CSI-RS resource set. Additionally or alternatively, the indication includes an IE that indicates whether the TRSs are to be recompensated by base station 105-a. In some cases, UE 115-a may receive the indication in a beam configuration that may include a TCI state configuration. The indication in the beam configuration may include a field that indicates whether the TRSs are to be pre-compensated by base station 105-a.

At 415, UE 115-c may receive, from TRP 145-g, the first TRS associated with an occasion of the data channel. At 420, UE 115-c may receive, from TRP 145-h, the second TRS associated with the occasion of the data channel.

At 425, UE 115-c may perform, based on the indication of the QCL relationship, a channel estimation procedure for the data channel based on the DMRS, the received first TRS, and the received second TRS. In some cases, UE 115-a may determine a Doppler shift value, Doppler Spread value, or a combination thereof between the received first TRS and the received second TRS. In some cases, UE 115-a may report the determined Doppler shift value, Doppler Spread value, or a combination thereof to base station 105-a. In some cases, UE 115-a may identify that the determined Doppler shift value, Doppler Spread value, or a combination thereof exceeds a threshold, and may report the value that exceeds the threshold to base station 105-a.

Figure 5:
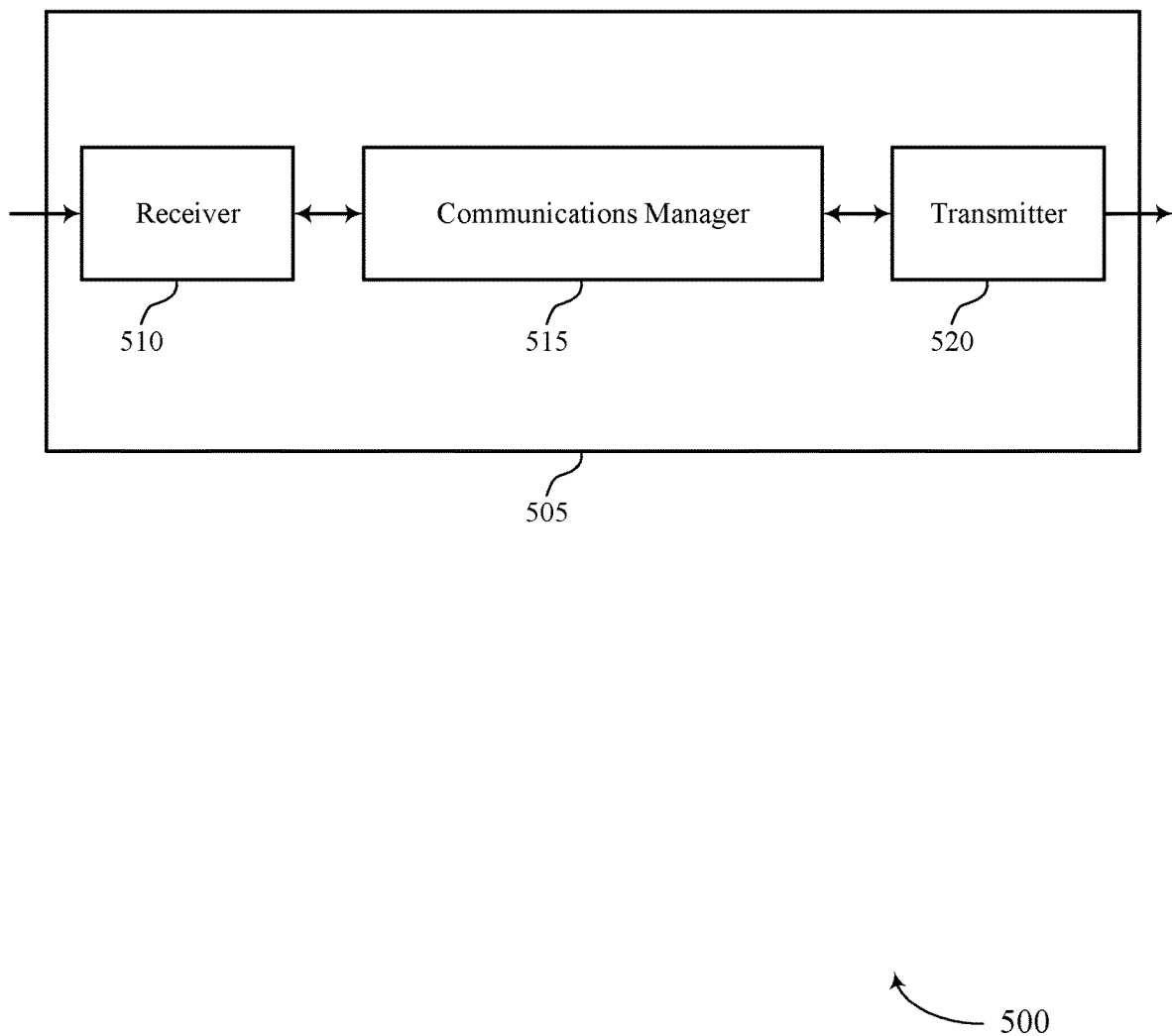
FIGS. 5 and 6 show block diagrams of devices that support QCL type for Doppler pre-compensated reference signals in accordance with aspects of the present disclosure.

FIG. 5 shows a block diagram 500 of a device 505 that supports QCL type for Doppler pre-compensated reference signals in accordance with aspects of the present disclosure. The device 505 may be an example of aspects of a UE 115 as described herein. The device 505 may include a receiver 510, a communications manager 515, and a transmitter 520. The device 505 may also include one or more processors, memory coupled with the one or more processors, and instructions stored in the memory that are executable by the one or more processors to enable the one or more processors to perform the Doppler pre-compensation features discussed herein. Each of these components may be in communication with one another (e.g., via one or more buses).

The receiver 510 may receive information such as packets, user data, or control information associated with various information channels (e.g., control channels, data channels, and information related to QCL type for Doppler pre-compensated reference signals, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive, from a base station, an indication of a QCL relationship indicating a relationship between a plurality of TRSs and a DMRS of a data channel, the plurality of TRSs including at least a first TRS and a second TRS, receive, from a first TRP, the first TRS associated with an occasion of the data channel, receive, from a second TRP, the second TRS associated with the occasion of the data channel, and perform, based on the indication of the QCL relationship, a channel estimation procedure for the data channel based on the DMRS, the received first TRS, and the received second TRS. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

The communications manager 515 as described herein may be implemented to realize one or more potential advantages. One implementation may allow the device 505 to more efficiently estimate channel conditions between one or more TRPs and device 505. For example, a device 5050 may receive two different Doppler pre-compensated reference signals from multiple TRPs and perform an efficient channel estimation procedure based on the received reference signals.

Based on implementing the pre-compensation techniques as described herein, a processor of a UE 115 (e.g., controlling the receiver 510, the transmitter 520, or the transceiver 820 as described with reference to FIG. 8) may increase reliability and efficiency in the communication reference signals between a UE 115 and one or more TRPs and the determination of channel properties based on the reference signals.

Figure 6:
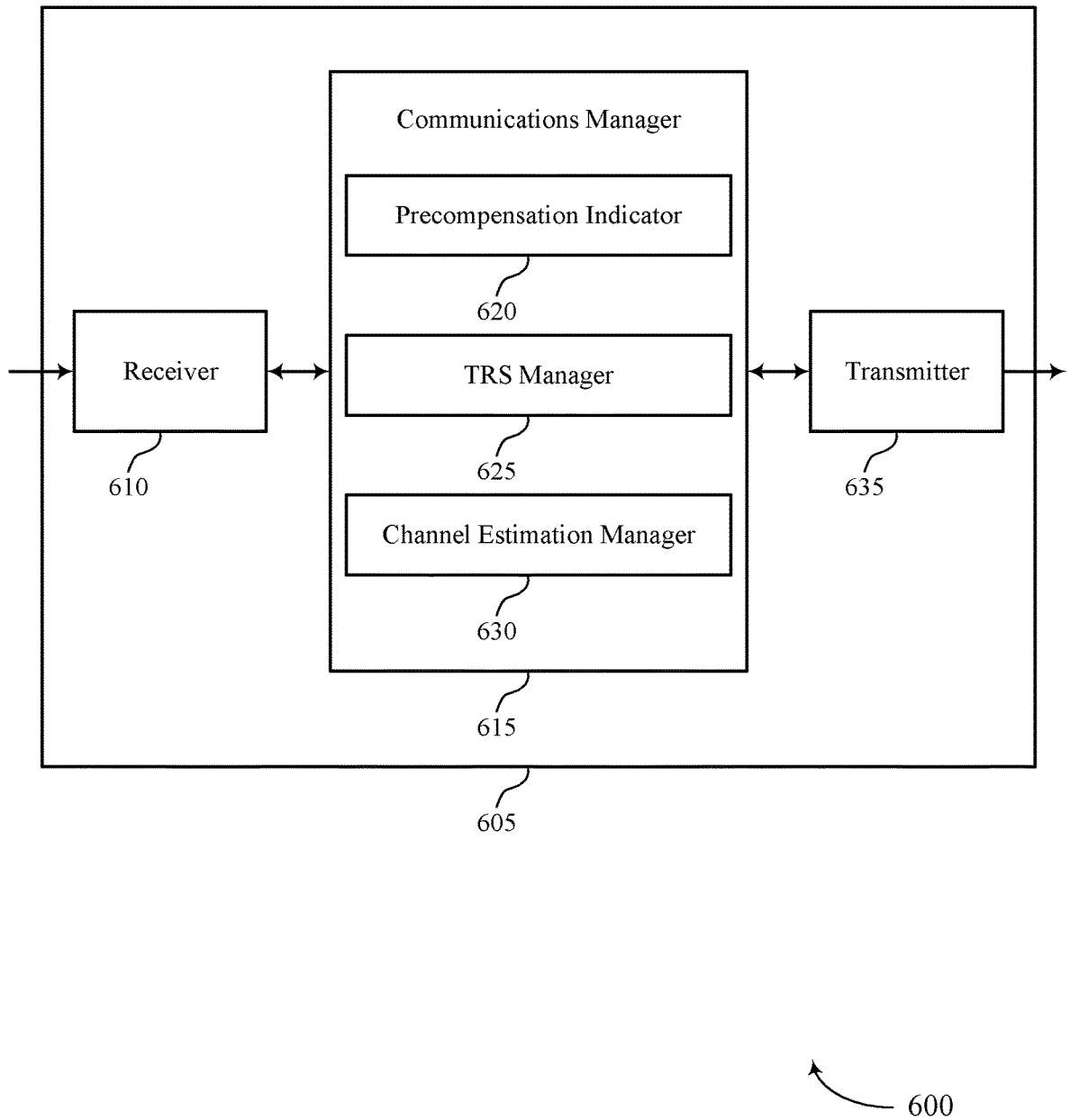

FIG. 6 shows a block diagram 600 of a device 605 that supports QCL type for Doppler pre-compensated reference signals in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to QCL type for Doppler pre-compensated reference signals, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a pre-compensation indicator 620, a TRS manager 625, and a channel estimation manager 630. The communications manager 615 may be an example of aspects of the communications manager 810 described herein.

The pre-compensation indicator 620 may receive, from a base station, an indication of a QCL relationship indicating a relationship between a plurality of TRSs and a DMRS of a data channel, the plurality of TRSs including at least a first TRS and a second TRS.

The TRS manager 625 may receive, from a first TRP, the first TRS associated with an occasion of the data channel and receive, from a second TRP, the second TRS associated with the occasion of the data channel.

The channel estimation manager 630 may perform, based on the indication of the QCL relationship, a channel estimation procedure for the data channel based on the DMRS, the received first TRS, and the received second TRS.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

In some cases, the pre-compensation indicator 620, the TRS manager 625, and the channel estimation manager 630 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of pre-compensation indicator 620, the TRS manager 625, and the channel estimation manager 630 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 7:
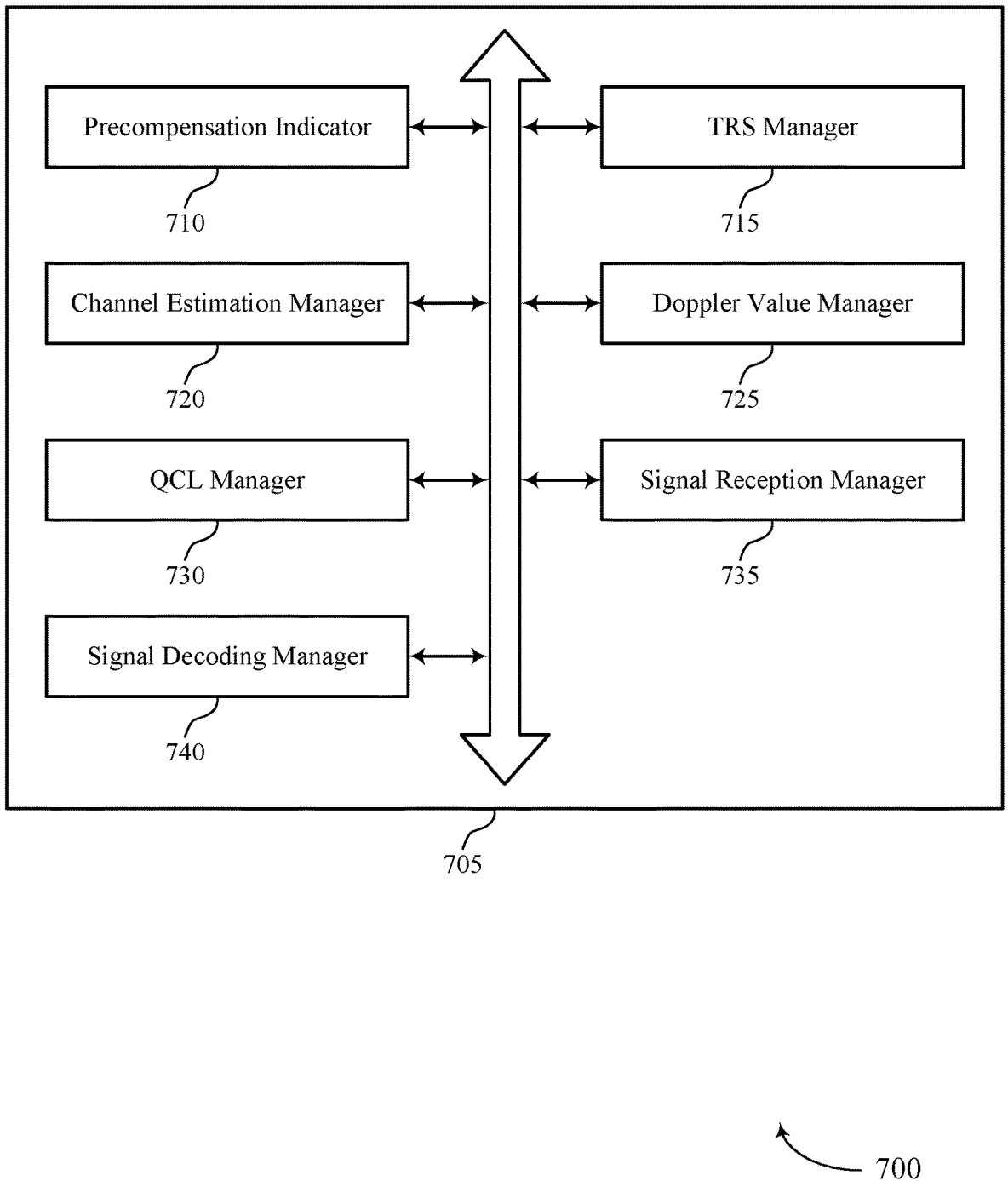
FIG. 7 shows a block diagram of a communications manager that supports QCL type for Doppler pre-compensated reference signals in accordance with aspects of the present disclosure.

FIG. 7 shows a block diagram 700 of a communications manager 705 that supports QCL type for Doppler pre-compensated reference signals in accordance with aspects of the present disclosure. The communications manager 705 may be an example of aspects of a communications manager 515, a communications manager 615, or a communications manager 810 described herein. The communications manager 705 may include a pre-compensation indicator 710, a TRS manager 715, a channel estimation manager 720, a Doppler value manager 725, a QCL manager 730, a signal reception manager 735, and a signal decoding manager 740. Each of these modules may communicate, directly or indirectly, with one another (e.g., via one or more buses).

The pre-compensation indicator 710 may receive, from a base station, an indication of a QCL relationship indicating a relationship between a plurality of TRSs and a DMRS of a data channel, the plurality of TRSs including at least a first TRS and a second TRS. The TRS manager 715 may receive, from a first TRP, the first TRS associated with an occasion of the data channel. In some examples, the TRS manager 715 may receive, from a second TRP, the second TRS associated with the occasion of the data channel. The channel estimation manager 720 may perform, based on the indication of the QCL relationship, a channel estimation procedure for the data channel based on the DMRS, the received first TRS, and the received second TRS.

In some examples, the pre-compensation indicator 710 may receive an indication that the base station is to perform pre-compensation of TRSs. In some examples, the pre-compensation indicator 710 may receive the indication in a beam configuration. In some examples, the pre-compensation indicator 710 may receive, in the occasion of the data channel, the DMRS and a data signal. In some examples, the pre-compensation indicator 710 may decode the received data signal based on the received DMRS and the indicated QCL relationship.

In some cases, the indication of the QCL relationship includes a field that indicates whether the plurality of TRSs are to be pre-compensated by the base station. In some cases, the indicated pre-compensation of the plurality of TRSs includes a Doppler shift pre-compensation, or a Doppler spread pre-compensation, or both, for the first TRP and the second TRP. In some cases, the beam configuration includes a TCI state configuration. In some cases, the indication in the beam configuration includes a field that indicates whether the plurality of TRSs are to be pre-compensated by the base station. In some cases, the indicated pre-compensation of the TRSs includes a QCL relationship.

In some cases, the QCL relationship includes an indication that a Doppler shift between the DMRS and the plurality of TRSs is within a first threshold value, or the QCL relationship includes an indication that a Doppler spread between the DMRS and the plurality of TRSs is within a second threshold value, or both. In some cases, the QCL relationship further includes the Doppler shift, the Doppler spread, an average delay, and a delay spread.

In some examples, the TRS manager 715 may receive the indication in a TRS configuration, the TRS configuration indicating at least a first set of resources for the first TRS and a second set of resources for the second TRS. In some examples, the TRS manager 715 may receive a configuration of the UE to receive the TRSs from a set of TRPs, including at least the first TRP and the second TRP. In some examples, the TRS manager 715 may receive, from a third TRP of the base station, a third TRS associated with the occasion of the data channel, where the channel estimation procedure is performed for the data channel based on the received indication, the received first TRS, the received second TRS, and the received third TRS.

In some cases, the occasion of the data channel is a SFN transmission from the first TRP and the second TRP. In some cases, the occasion of the data channel is for a SFN transmission of the data channel that includes the DMRS from the first TRP and the second TRP. In some cases, the indication of the QCL relationship includes an indication of whether the plurality of TRSs are to be pre-compensated by the base station. In some cases, the TRS configuration includes a channel state information reference signal resource set. In some cases, the indication in the TRS configuration includes an information element that indicates whether the plurality of TRSs are to be pre-compensated by the base station. In some cases, the first TRP and the second TRP are associated with one layer of the data channel. In some cases, the data channel includes one layer, the one layer including the single layer, and a DMRS of the data channel includes one DMRS port.

The Doppler value manager 725 may determine, based on the received first TRS, a first Doppler shift value, or a first Doppler spread value, or both, associated with the first TRP. In some examples, the Doppler value manager 725 may determine, based on the received second TRS, a second Doppler shift value, or a second Doppler spread value, or both, associated with the second TRP. In some examples, the Doppler value manager 725 may transmit, to the base station, a report indicating the first Doppler shift value and the second Doppler shift value, or the first Doppler spread value and the second Doppler spread value, or both.

In some examples, the Doppler value manager 725 may determine a Doppler shift value, or a Doppler spread value, or both, between the received first TRS and received second TRS. In some examples, the Doppler value manager 725 may report the determined Doppler shift value, or the Doppler spread value, or both, to the base station. In some examples, the Doppler value manager 725 may identify that the determined Doppler shift value exceeds a first threshold, or the determined Doppler spread value exceeds a second threshold, or both, where the determined Doppler shift value is reported to the base station based on the determined Doppler shift value exceeding the first threshold, or the determined Doppler spread value is reported to the base station based on the determined Doppler spread value exceeding the second threshold, or both.

The QCL manager 730 may receive an indication of a first QCL relationship between the first TRS and a DMRS of the data channel, and a second QCL relationship between the first TRS and the DMRS of the data channel. The signal reception manager 735 may receive, in the occasion of the data channel, the DMRS and a data signal. The signal decoding manager 740 may decode the received data signal based on the performing of the channel estimation procedure. The signal decoding manager 740 may decode the received data signal based on the received DMRS, the indicated first QCL relationship, and the indicated second QCL relationship.

In some cases, the pre-compensation indicator 710, the TRS manager 715, the channel estimation manager 720, the Doppler value manager 725, the QCL manager 730, the signal reception manager 735, and the signal decoding manager 740 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the pre-compensation indicator 710, the TRS manager 715, the channel estimation manager 720, the Doppler value manager 725, the QCL manager 730, the signal reception manager 735, and the signal decoding manager 740 discussed herein.

Figure 8:
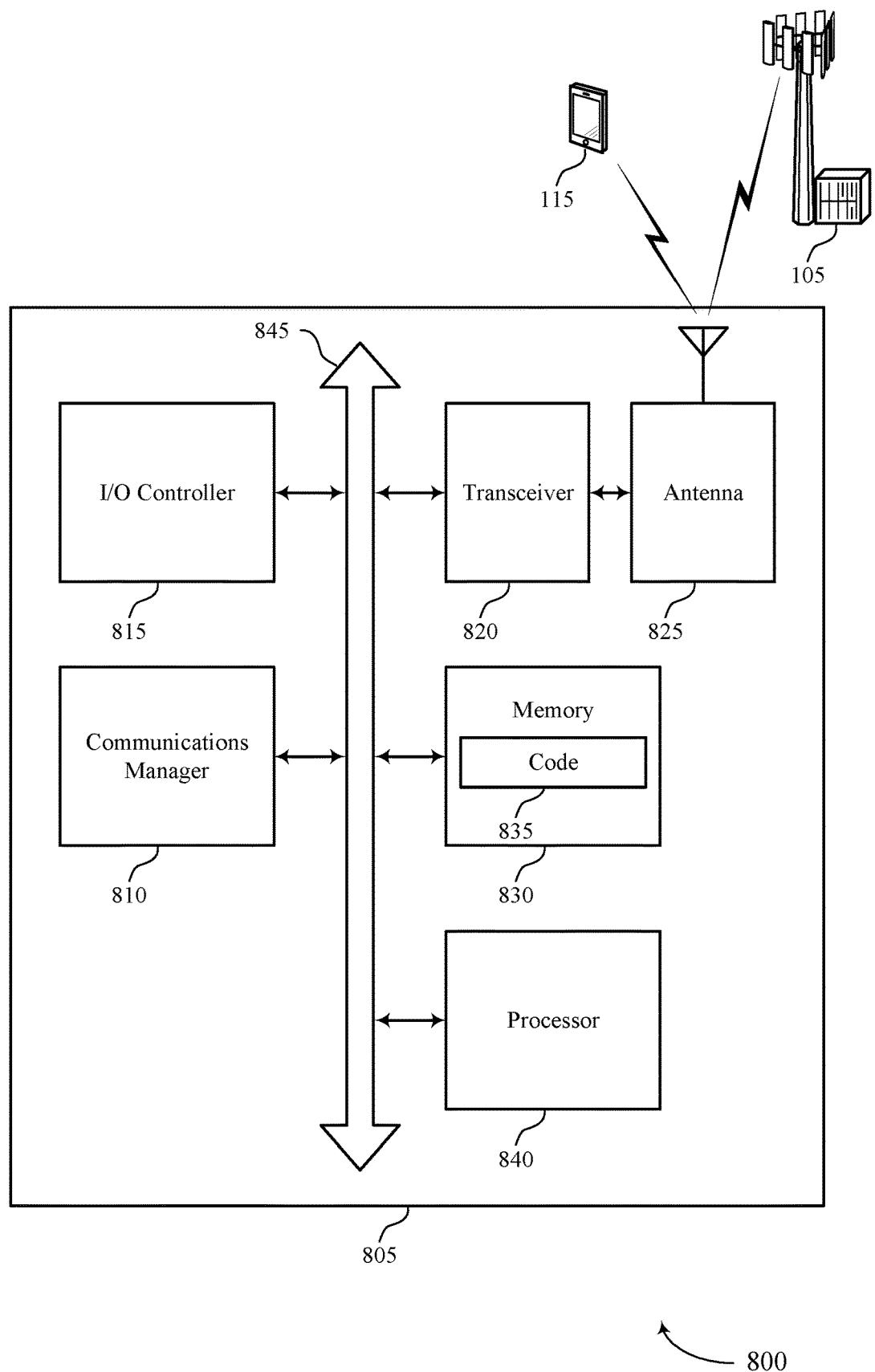
FIG. 8 shows a diagram of a system including a device that supports QCL type for Doppler pre-compensated reference signals in accordance with aspects of the present disclosure.

FIG. 8 shows a diagram of a system 800 including a device 805 that supports QCL type for Doppler pre-compensated reference signals in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive, from a base station, an indication of a QCL relationship indicating a relationship between a plurality of TRSs and a DMRS of a data channel, the plurality of TRSs including at least a first TRS and a second TRS, receive, from a first TRP, the first TRS associated with an occasion of the data channel, receive, from a second TRP, the second TRS associated with the occasion of the data channel, and perform, based on the indication of the QCL relationship, a channel estimation procedure for the data channel based on the DMRS, the received first TRS, and the received second TRS.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting QCL type for Doppler pre-compensated reference signals).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

By including or configuring the communications manager 810 in accordance with examples as described herein, the device 805 may support techniques for improved communication reliability, reduced latency, improved user experience related to reduced processing, reduced power consumption, more efficient utilization of communication resources, improved coordination between devices, longer battery life, improved utilization of processing capability.

Figure 9:
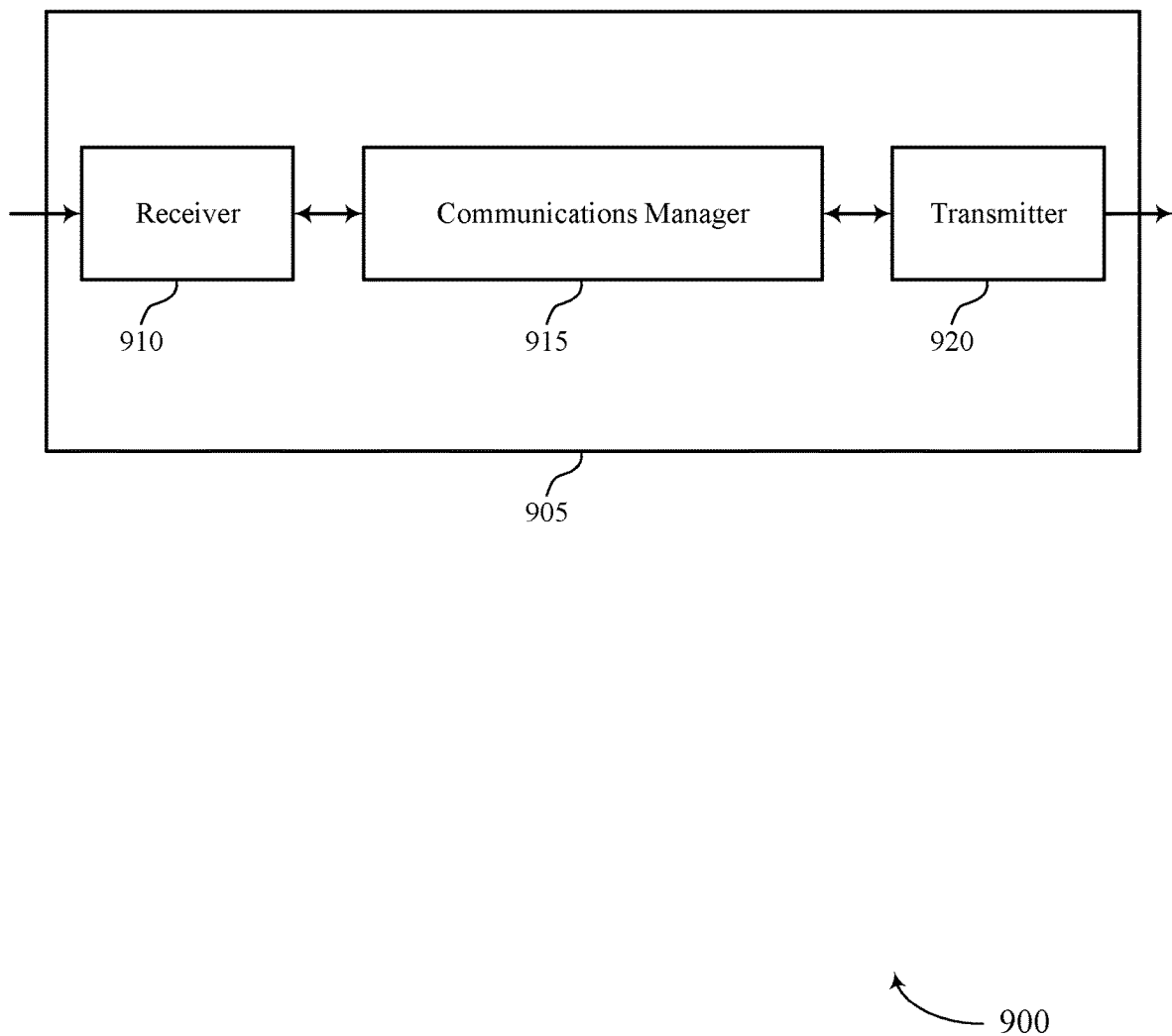
FIGS. 9 and 10 show block diagrams of devices that support QCL type for Doppler pre-compensated reference signals in accordance with aspects of the present disclosure.

FIG. 9 shows a block diagram 900 of a device 905 that supports QCL type for Doppler pre-compensated reference signals in accordance with aspects of the present disclosure. The device 905 may be an example of aspects of a base station 105 as described herein. The device 905 may include a receiver 910, a communications manager 915, and a transmitter 920. The device 905 may also include one or more processors, memory coupled with the one or more processors, and instructions stored in the memory that are executable by the one or more processors to enable the one or more processors to perform the Doppler pre-compensation features discussed herein. Each of these components may be in communication with one another (e.g., via one or more buses).

The receiver 910 may receive information such as packets, user data, or control information associated with various information channels (e.g., control channels, data channels, and information related to QCL type for Doppler pre-compensated reference signals, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may transmit, to a UE, an indication of a QCL relationship indicating a relationship between a plurality of TRSs and a DMRS of a data channel, the plurality of TRS including at least a first TRS and a second TRS, transmit, from a first TRP of the base station, the first TRS and the DMRS of the data channel, and transmit, from a second TRP of the base station, the second TRS and the DMRS of the data channel. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

By including or configuring the communications manager 915 in accordance with examples as described herein, the device 905 (e.g., a processor controlling or otherwise coupled to the receiver 910, the transmitter 920, the communications manager 915, or a combination thereof) may support techniques for reduced processing, reduced power consumption, and/or more efficient utilization of communication resources.

Figure 10:
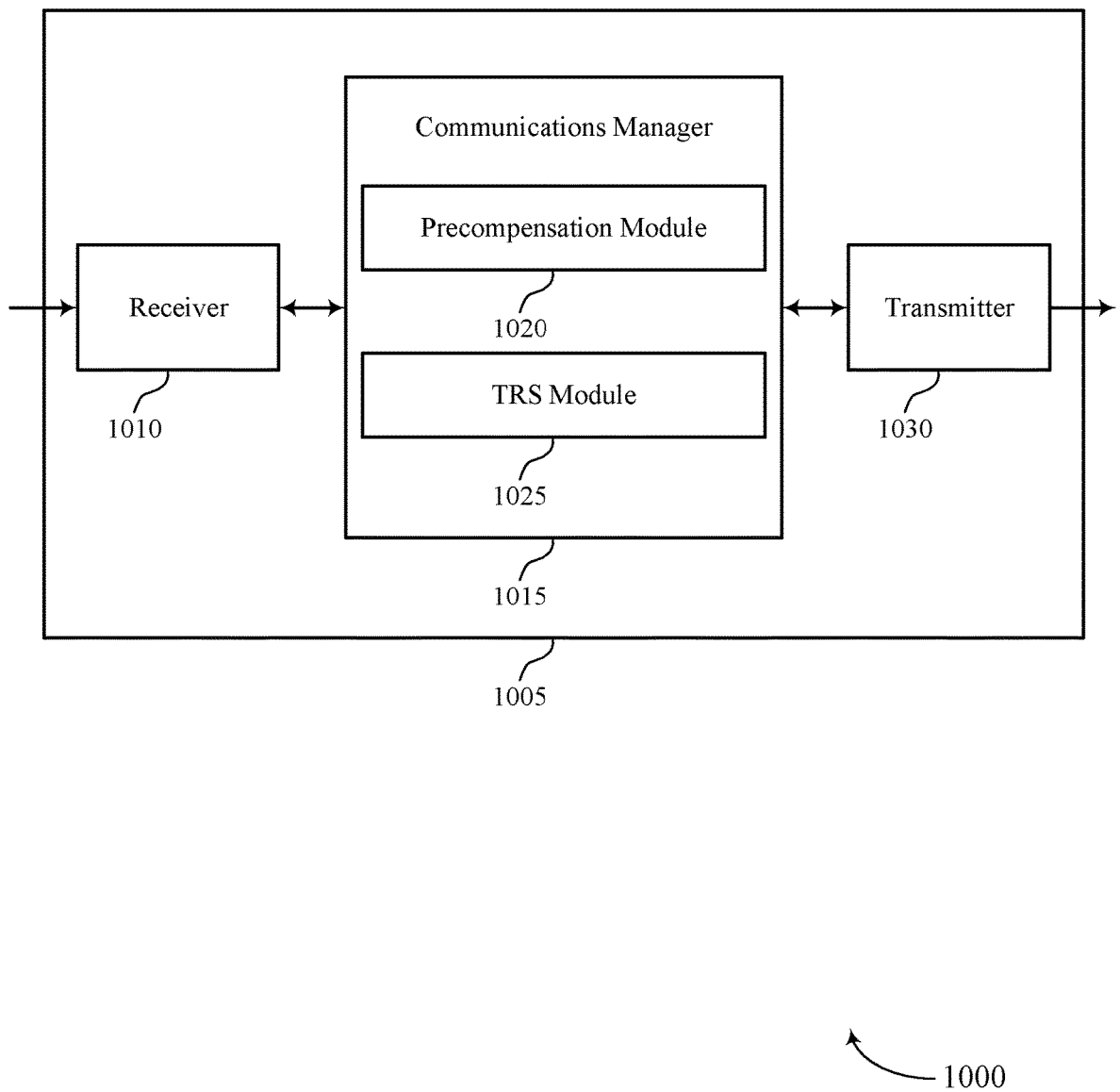

FIG. 10 shows a block diagram 1000 of a device 1005 that supports QCL type for Doppler pre-compensated reference signals in accordance with aspects of the present disclosure. The device 1005 may be an example of aspects of a device 905, or a base station 105 as described herein. The device 1005 may include a receiver 1010, a communications manager 1015, and a transmitter 1030. The device 1005 may also include a processor. Each of these components may be in communication with one another (e.g., via one or more buses).

The receiver 1010 may receive information such as packets, user data, or control information associated with various information channels (e.g., control channels, data channels, and information related to QCL type for Doppler pre-compensated reference signals, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a pre-compensation module 1020 and a TRS module 1025. The communications manager 1015 may be an example of aspects of the communications manager 1210 described herein.

The pre-compensation module 1020 may transmit, to a UE, an indication of a QCL relationship indicating a relationship between a plurality of TRSs and a DMRS of a data channel, the plurality of TRS including at least a first TRS and a second TRS.

The TRS module 1025 may transmit, from a first TRP of the base station, the first TRS and the DMRS of the data channel and transmit, from a second TRP of the base station, the second TRS and the DMRS of the data channel.

The transmitter 1030 may transmit signals generated by other components of the device 1005. In some examples, the transmitter 1030 may be collocated with a receiver 1010 in a transceiver module. For example, the transmitter 1030 may be an example of aspects of the transceiver 1220 described with reference to FIG. 12. The transmitter 1030 may utilize a single antenna or a set of antennas.

In some cases, the pre-compensation module 1020 and the TRS module 1025 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the pre-compensation module 1020 and the TRS module 1025 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 11:
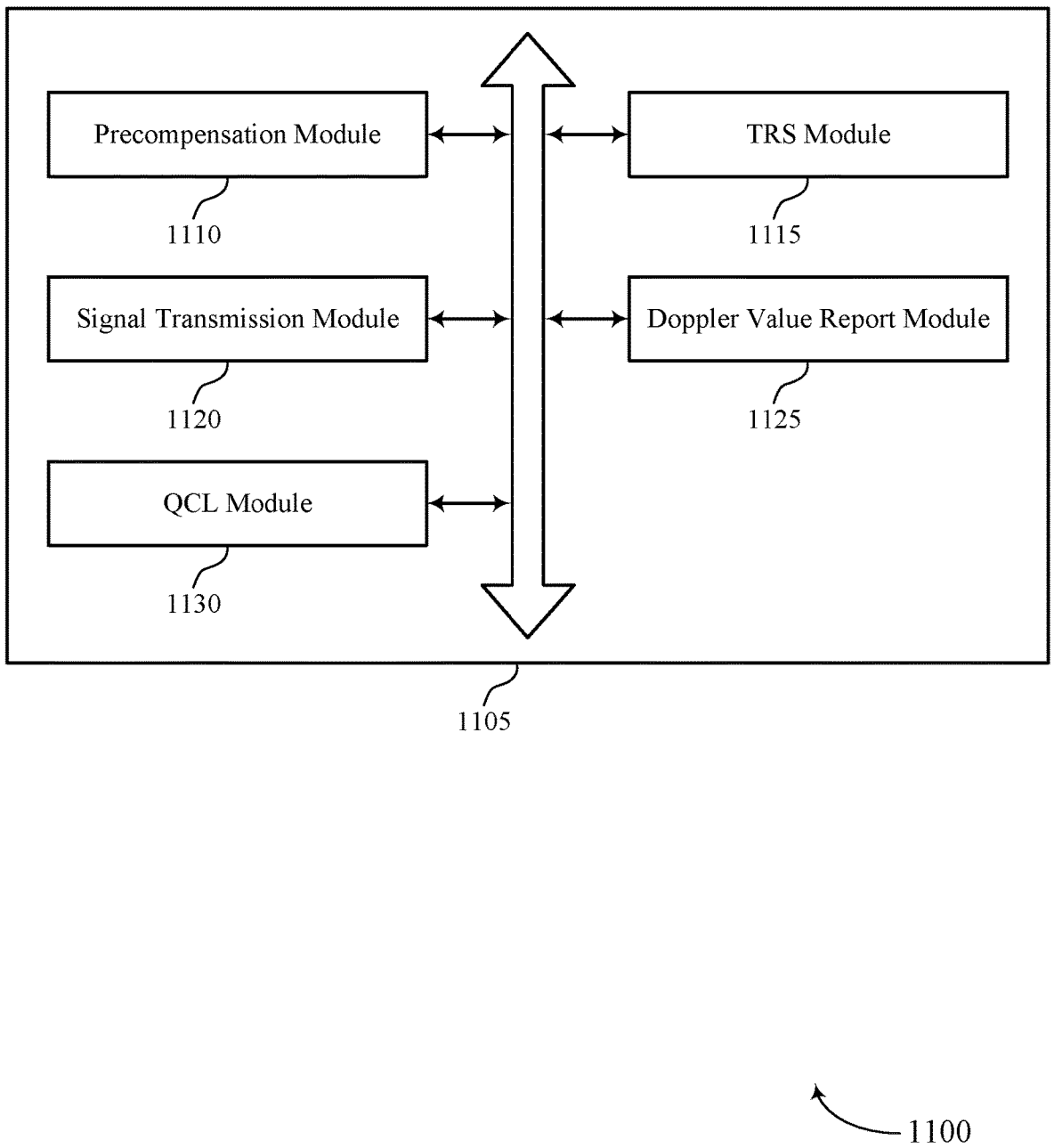
FIG. 11 shows a block diagram of a communications manager that supports QCL type for Doppler pre-compensated reference signals in accordance with aspects of the present disclosure.

FIG. 11 shows a block diagram 1100 of a communications manager 1105 that supports QCL type for Doppler pre-compensated reference signals in accordance with aspects of the present disclosure. The communications manager 1105 may be an example of aspects of a communications manager 915, a communications manager 1015, or a communications manager 1210 described herein. The communications manager 1105 may include a pre-compensation module 1110, a TRS module 1115, a signal transmission module 1120, a Doppler value report module 1125, and a QCL module 1130. Each of these modules may communicate, directly or indirectly, with one another (e.g., via one or more buses).

The pre-compensation module 1110 may transmit, to a UE, an indication of a QCL relationship indicating a relationship between a plurality of TRSs and a DMRS of a data channel, the plurality of TRS including at least a first TRS and a second TRS. The TRS module 1115 may transmit, from a first TRP of the base station, the first TRS and the DMRS of the data channel. In some examples, the TRS module 1115 may transmit, from a second TRP of the base station, the second TRS and the DMRS of the data channel.

In some cases, the DMRS is transmitted as a SFN transmission from the first TRP and the second TRP. In some cases, the indication of the QCL relationship includes an indication of whether the plurality of TRSs are to be pre-compensated by the base station.

In some examples, the pre-compensation module 1110 may perform pre-compensation on a first TRS associated with an occasion of a data channel and a second TRS associated with the occasion of the data channel. In some cases, the first TRS may be pre-compensated and the second TRS may be pre-compensated.

In some examples, the pre-compensation module 1110 may transmit, to a UE, an indication that the base station is to perform pre-compensation of TRSs. In some examples, the pre-compensation module 1110 may transmit the indication in a beam configuration. In some examples, the pre-compensation module 1110 may modify, based on the received report, the performed pre-compensation for a subsequent TRS transmitted by the first TRP, or a subsequent TRS transmitted by the second TRP, or both.

In some cases, the indicated pre-compensation of the TRSs includes a Doppler shift pre-compensation, or a Doppler spread pre-compensation, or both, for the first TRP and the second TRP. In some cases, the beam configuration includes a TCI state configuration. In some cases, the indication in the beam configuration includes a field that indicates whether the plurality of TRSs are to be pre-compensated by the base station.

In some examples, the TRS module 1115 may transmit the indication in a TRS configuration, the TRS configuration indicating at least a first set of resources for the first TRS and a second set of resources for the second TRS. In some examples, the TRS module 1115 may transmit, to the UE, a configuration for the UE to use to receive the plurality of TRSs from a set of TRPs, including at least the first TRP and the second TRP. In some examples, the TRS module 1115 may perform pre-compensation on a third TRS associated with the occasion of the data channel. In some examples, the TRS module 1115 may transmit the pre-compensated third TRS from a third TRP of the base station.

In some cases, the TRS configuration includes a channel state information reference signal resource set. In some cases, the indication in the TRS configuration includes an information element that indicates whether the plurality of TRSs are to be pre-compensated by the base station. In some cases, the first TRP and the second TRP are associated with one layer of the data channel. In some cases, the data channel includes one layer, the one layer including the one layer, and a DMRS of the data channel includes one DMRS port.

The signal transmission module 1120 may transmit a data signal on the occasion of the data channel as a SFN transmission from the first TRP and the second TRP.

In some examples, the QCL module 1130 may transmit an indication of a first QCL relationship between the first TRS and a DMRS of the data channel, and a second QCL relationship between the first TRS and the DMRS of the data channel. In some examples, the signal transmission module 1120 may transmit, in the occasion of the data channel, the DMRS and a data signal.

The Doppler value report module 1125 may receive, from the UE, a report indicating a first Doppler shift value associated with the first TRP and a second Doppler shift value associated with the second TRP, or a first Doppler spread value associated with the first TRP and a second Doppler spread value associated with the second TRP, or both.

In some examples, the Doppler value report module 1125 may receive, from the UE, a report indicating a Doppler shift value or a Doppler spread value, or both, between the first TRS (e.g., pre-compensated first TRS, in some cases) and the second TRS (e.g., pre-compensated second TRS, in some cases). In some examples, the Doppler value report module 1125 may identify, based on receiving the report from the UE, that the Doppler shift value exceeds a first threshold, or the Doppler spread value exceeds a second threshold, or both.

The QCL module 1130 may transmit, in the occasion of the data channel, the DMRS and a data signal. In some cases, the indicated pre-compensation of the TRSs includes a QCL relationship. In some cases, the QCL relationship includes an indication that a Doppler shift between the DMRS and the TRSs is within a first threshold value, or the QCL relationship includes an indication that a Doppler spread between the DMRS and the TRSs is within a second threshold value, or both. In some cases, the QCL relationship further includes the Doppler shift, the Doppler spread, an average delay, and a delay spread.

In some cases, the pre-compensation module 1110, the TRS module 1115, the signal transmission module 1120, the Doppler value report module 1125, and the QCL module 1130 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the pre-compensation module 1110, the TRS module 1115, the signal transmission module 1120, the Doppler value report module 1125, and the QCL module 1130 discussed herein.

Figure 12:
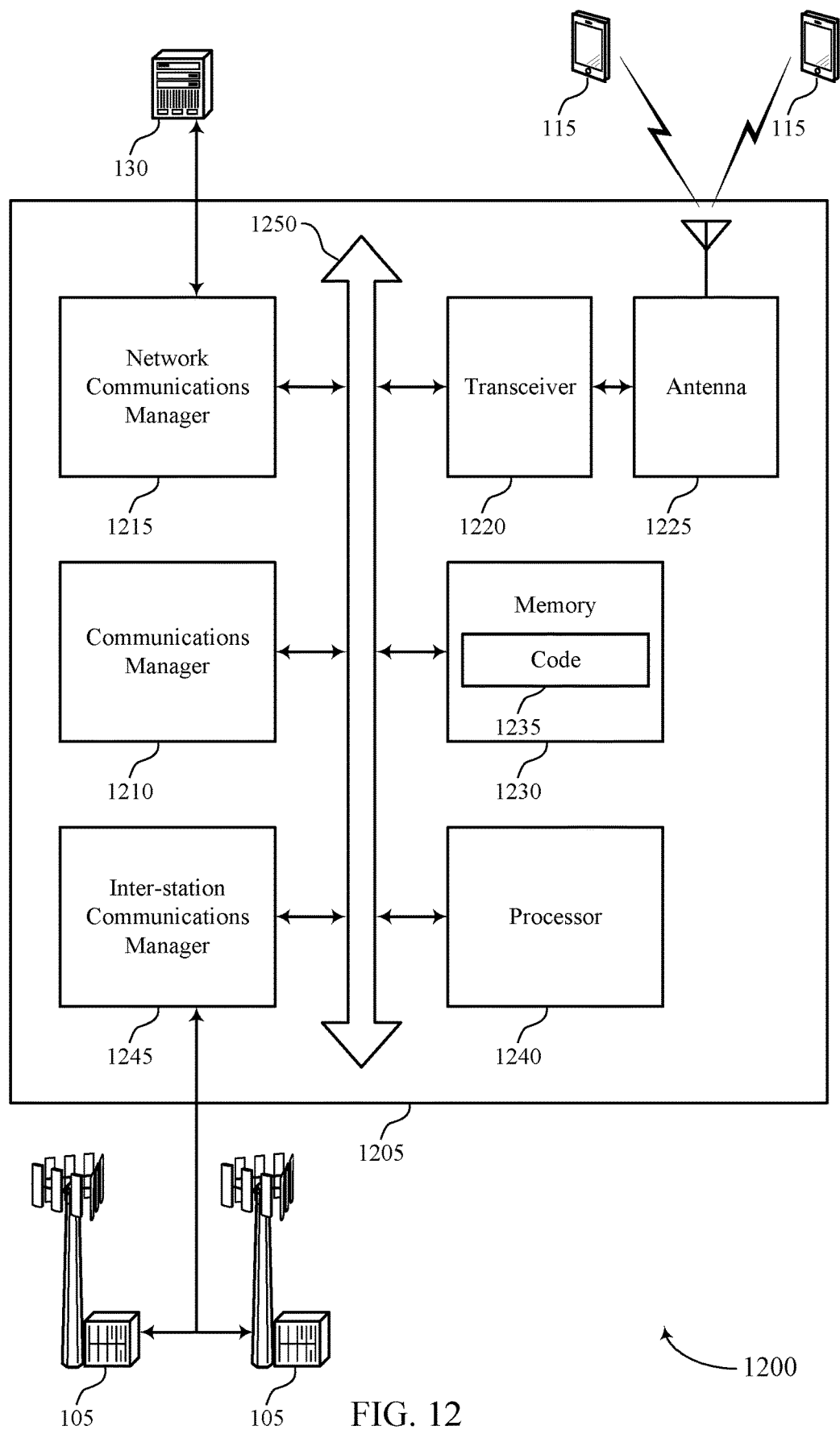
FIG. 12 shows a diagram of a system including a device that supports QCL type for Doppler pre-compensated reference signals in accordance with aspects of the present disclosure.

FIG. 12 shows a diagram of a system 1200 including a device 1205 that supports QCL type for Doppler pre-compensated reference signals in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may transmit, to a UE, an indication of a QCL relationship indicating a relationship between a plurality of TRSs and a DMRS of a data channel, the plurality of TRS including at least a first TRS and a second TRS, transmit, from a first TRP of the base station, the first TRS and the DMRS of the data channel, and transmit, from a second TRP of the base station, the second TRS and the DMRS of the data channel.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting QCL type for Doppler pre-compensated reference signals).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

By including or configuring the communications manager 1210 in accordance with examples as described herein, the device 1205 may support techniques for improved communication reliability, reduced latency, improved user experience related to reduced processing, reduced power consumption, more efficient utilization of communication resources, improved coordination between devices, longer battery life, improved utilization of processing capability.

Figure 13:
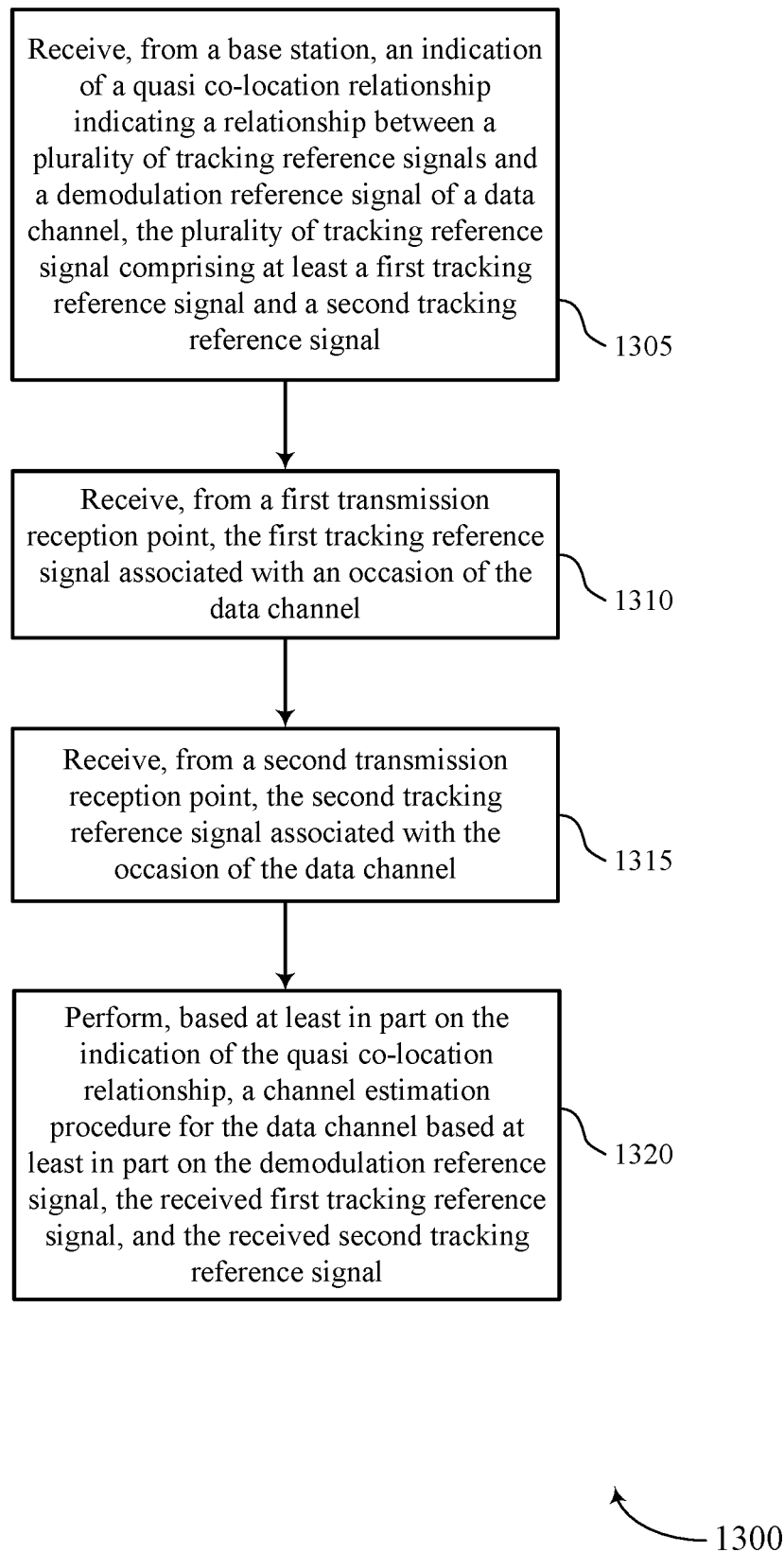
FIGS. 13 through 16 show flowcharts illustrating methods that support QCL type for Doppler pre-compensated reference signals in accordance with aspects of the present disclosure.

FIG. 13 shows a flowchart illustrating a method 1300 that supports QCL type for Doppler pre-compensated reference signals in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may receive, from a base station, an indication of a QCL relationship indicating a relationship between a plurality of TRSs and a DMRS of a data channel, the plurality of TRS including at least a first TRS and a second TRS. The operations of 1305 may be performed according to the methods described herein. In some examples, aspects of the operations of 1305 may be performed by a pre-compensation indicator as described with reference to FIGS. 5 through 8.

At 1310, the UE may receive, from a first TRP (TRP), the first TRS associated with an occasion of the data channel. The operations of 1310 may be performed according to the methods described herein. In some examples, aspects of the operations of 1310 may be performed by a TRS manager as described with reference to FIGS. 5 through 8.

At 1315, the UE may receive, from a second TRP, the second TRS associated with the occasion of the data channel. The operations of 1315 may be performed according to the methods described herein. In some examples, aspects of the operations of 1315 may be performed by a TRS manager as described with reference to FIGS. 5 through 8.

At 1320, the UE may perform, based on the indication of the QCL relationship, a channel estimation procedure for the data channel based on the DMRS, the received first TRS, and the received second TRS. The operations of 1320 may be performed according to the methods described herein. In some examples, aspects of the operations of 1320 may be performed by a channel estimation manager as described with reference to FIGS. 5 through 8.

Figure 14:
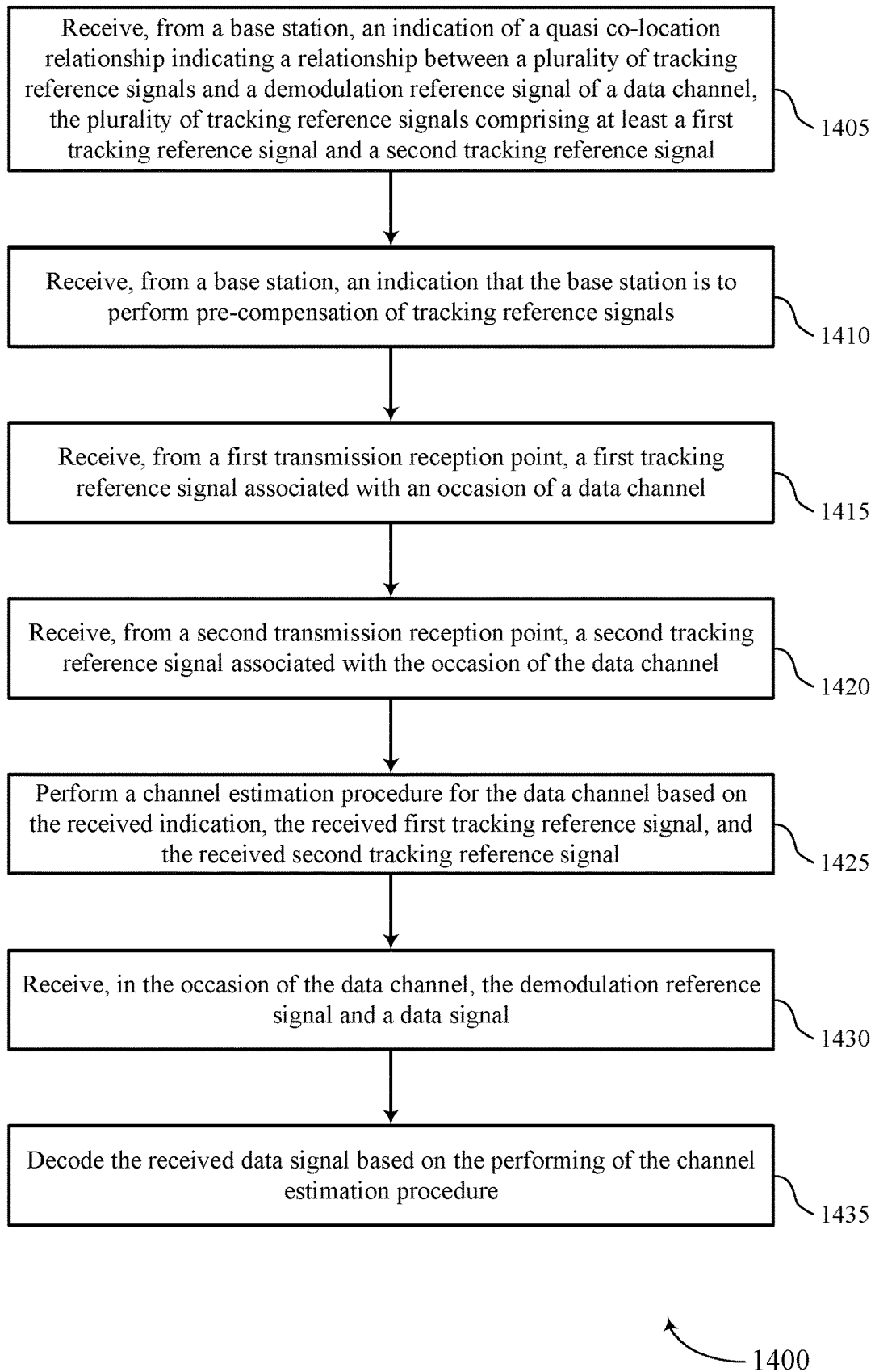

FIG. 14 shows a flowchart illustrating a method 1400 that supports QCL type for Doppler pre-compensated reference signals in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may receive, from a base station, an indication of a QCL relationship indicating a relationship between a plurality of TRSs and a DMRS of a data channel, the plurality of TRSs including at least a first TRS and a second TRS. The operations of 1405 may be performed according to the methods described herein. In some examples, aspects of the operations of 1405 may be performed by a QCL manager as described with reference to FIGS. 5 through 8.

At 1410, the UE may receive, from a base station, an indication that the base station is to perform pre-compensation of TRSs. The operations of 1410 may be performed according to the methods described herein. In some examples, aspects of the operations of 1410 may be performed by a pre-compensation indicator as described with reference to FIGS. 5 through 8.

At 1415, the UE may receive, from a first TRP, a first TRS associated with an occasion of a data channel. The operations of 1415 may be performed according to the methods described herein. In some examples, aspects of the operations of 1415 may be performed by a TRS manager as described with reference to FIGS. 5 through 8.

At 1420, the UE may receive, from a second TRP, a second TRS associated with the occasion of the data channel. The operations of 1420 may be performed according to the methods described herein. In some examples, aspects of the operations of 1420 may be performed by a TRS manager as described with reference to FIGS. 5 through 8.

At 1425, the UE may perform a channel estimation procedure for the data channel based on the received indication, the received first TRS, and the received second TRS. The operations of 1425 may be performed according to the methods described herein. In some examples, aspects of the operations of 1425 may be performed by a channel estimation manager as described with reference to FIGS. 5 through 8.

At 1430, the UE may receive, in the occasion of the data channel, the DMRS and a data signal. The operations of 1430 may be performed according to the methods described herein. In some examples, aspects of the operations of 1430 may be performed by a signal reception manager as described with reference to FIGS. 5 through 8.

At 1435, the UE may decode the received data signal based on the performing of the channel estimation procedure. The operations of 1435 may be performed according to the methods described herein. In some examples, aspects of the operations of 1435 may be performed by a signal decoding manager as described with reference to FIGS. 5 through 8.

Figure 15:
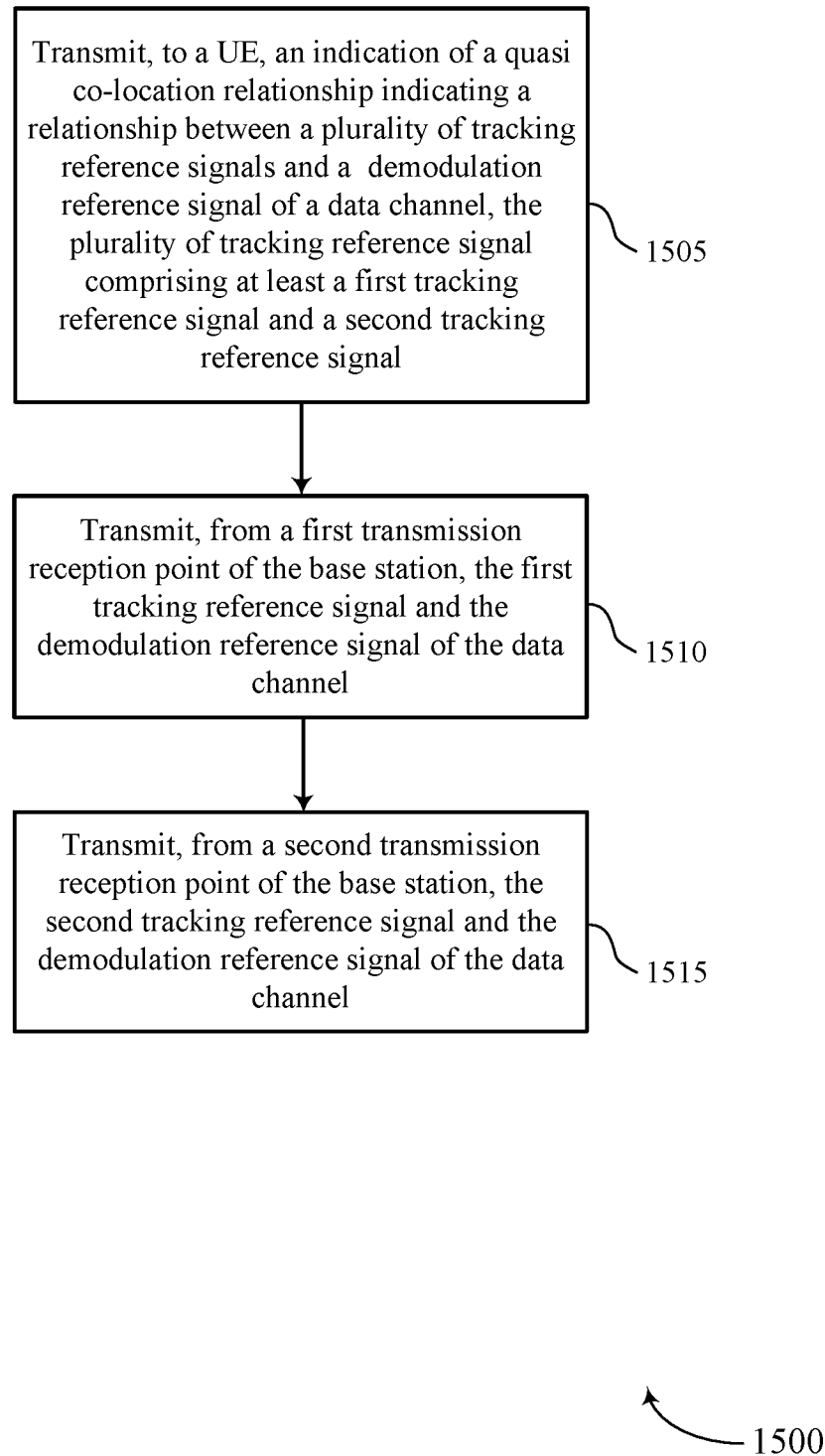

FIG. 15 shows a flowchart illustrating a method 1500 that supports QCL type for Doppler pre-compensated reference signals in accordance with aspects of the present disclosure. The operations of method 1500 may be implemented by a base station 105 or its components as described herein. For example, the operations of method 1500 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1505, the base station may transmit, to a UE, an indication of a QCL relationship indicating a relationship between a plurality of TRSs and a DMRS of a data channel, the plurality of TRS including at least a first TRS and a second TRS. The operations of 1505 may be performed according to the methods described herein. In some examples, aspects of the operations of 1505 may be performed by a pre-compensation module as described with reference to FIGS. 9 through 12.

At 1510, the base station may transmit, from a first TRP of the base station, the first TRS and the DMRS of the data channel. The operations of 1510 may be performed according to the methods described herein. In some examples, aspects of the operations of 1510 may be performed by a TRS module as described with reference to FIGS. 9 through 12.

At 1515, the base station may transmit, from a second TRP of the base station, the second TRS and the DMRS of the data channel. The operations of 1515 may be performed according to the methods described herein. In some examples, aspects of the operations of 1515 may be performed by a TRS module as described with reference to FIGS. 9 through 12.

Figure 16:
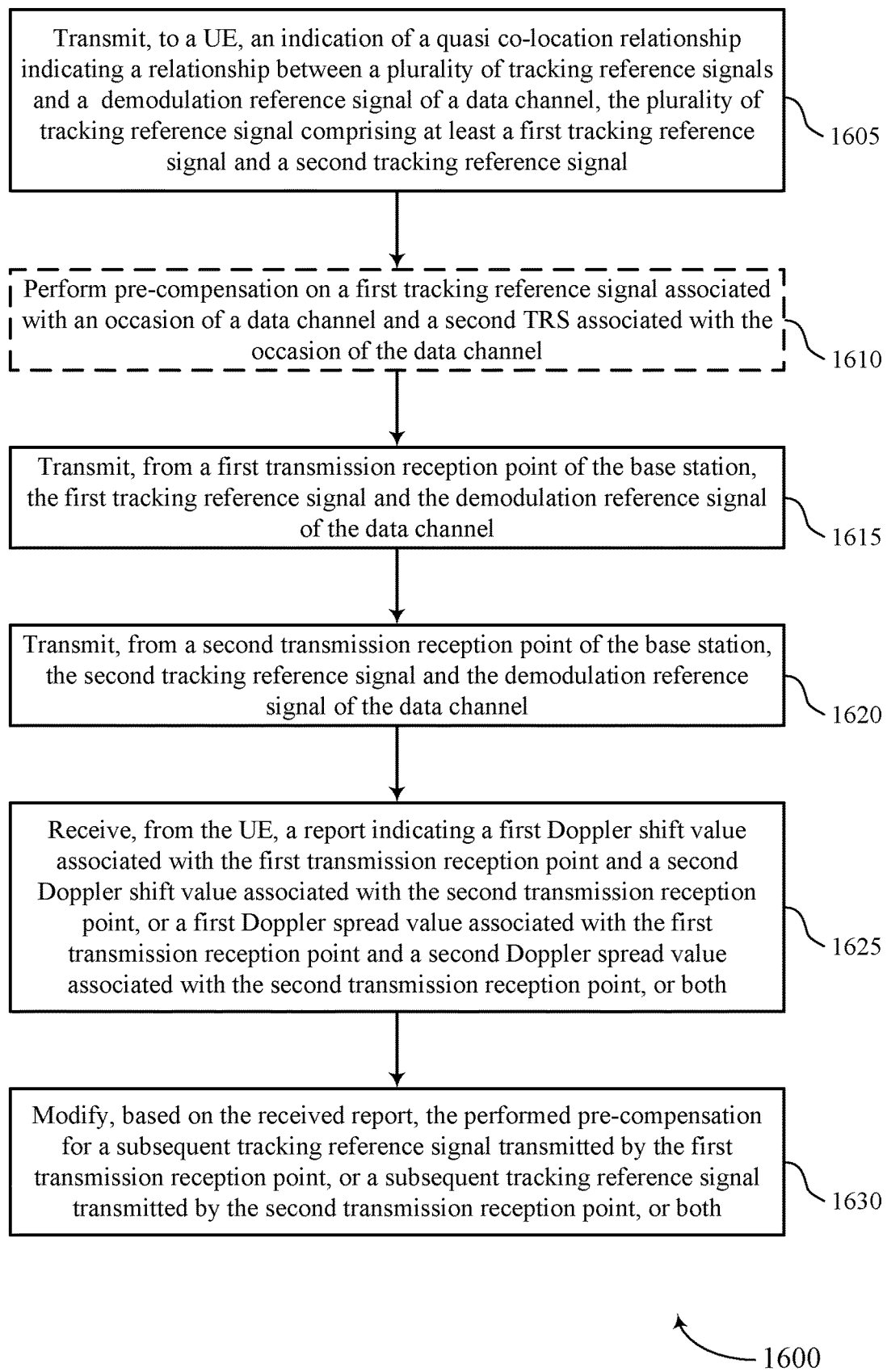

FIG. 16 shows a flowchart illustrating a method 1600 that supports QCL type for Doppler pre-compensated reference signals in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may transmit, to a UE, an indication of a QCL relationship indicating a relationship between a plurality of TRSs and a DMRS of a data channel, the plurality of TRS including at least a first TRS and a second TRS. The operations of 1605 may be performed according to the methods described herein. In some examples, aspects of the operations of 1605 may be performed by a pre-compensation module as described with reference to FIGS. 9 through 12.

At 1610, the base station may optionally perform pre-compensation on a first TRS associated with an occasion of a data channel and a second TRS associated with the occasion of the data channel. The operations of 1610 may be performed according to the methods described herein. In some examples, aspects of the operations of 1610 may be performed by a pre-compensation module as described with reference to FIGS. 9 through 12.

At 1615, the base station may transmit, from a first TRP of the base station, the first TRS and the DMRS of the data channel. The operations of 1615 may be performed according to the methods described herein. In some examples, aspects of the operations of 1615 may be performed by a TRS module as described with reference to FIGS. 9 through 12.

At 1620, the base station may transmit, from a second TRP of the base station, the second TRS and the DMRS of the data channel. The operations of 1620 may be performed according to the methods described herein. In some examples, aspects of the operations of 1620 may be performed by a TRS module as described with reference to FIGS. 9 through 12.

At 1625, the base station may receive, from the UE, a report indicating a first Doppler shift value associated with the first TRP and a second Doppler shift value associated with the second TRP, or a first Doppler spread value associated with the first TRP and a second Doppler spread value associated with the second TRP, or both. The operations of 1625 may be performed according to the methods described herein. In some examples, aspects of the operations of 1625 may be performed by a Doppler value report module as described with reference to FIGS. 9 through 12.

At 1630, the base station may modify, based on the received report, the performed pre-compensation for a subsequent TRS transmitted by the first TRP, or a subsequent TRS transmitted by the second TRP, or both. The operations of 1630 may be performed according to the methods described herein. In some examples, aspects of the operations of 1630 may be performed by a pre-compensation module as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, comprising: receiving, from a base station, an indication of a quasi co-location relationship indicating a relationship between a plurality of tracking reference signals and a demodulation reference signal of a data channel, the plurality of tracking reference signals comprising at least a first tracking reference signal and a second tracking reference signal; receiving, from a first transmission reception point, the first tracking reference signal associated with an occasion of the data channel; receiving, from a second transmission reception point, the second tracking reference signal associated with the occasion of the data channel; and performing, based at least in part on the indication of the quasi co-location relationship, a channel estimation procedure for the data channel based at least in part on the demodulation reference signal, the received first tracking reference signal, and the received second tracking reference signal.

Aspect 2: The method of aspect 1, wherein the occasion of the data channel is for a single frequency network transmission of the data channel that comprises the demodulation reference signal from the first transmission reception point and the second transmission reception point.

Aspect 3: The method of any of aspects 1 through 2, wherein the indication of the quasi co-location relationship comprises an indication of whether the plurality of tracking reference signals are to be pre-compensated by the base station.

Aspect 4: The method of aspect 3, wherein the indicated pre-compensation of the plurality of tracking reference signals comprises a Doppler shift pre-compensation, or a Doppler spread pre-compensation, or both, for the first transmission reception point and the second transmission reception point.

Aspect 5: The method of any of aspects 1 through 4, wherein receiving the indication of the quasi co-location relationship comprises: receiving the indication in a tracking reference signal configuration, the tracking reference signal configuration indicating at least a first set of resources for the first tracking reference signal and a second set of resources for the second tracking reference signal.

Aspect 6: The method of aspect 5, wherein the indication in the tracking reference signal configuration comprises an information element that indicates whether the plurality of tracking reference signals are to be pre-compensated by the base station.

Aspect 7: The method of any of aspects 1 through 6, wherein the indication of the quasi co-location relationship comprises a field that indicates whether the plurality of tracking reference signals are to be pre-compensated by the base station.

Aspect 8: The method of any of aspects 1 through 7, further comprising: determining, based at least in part on the received first tracking reference signal, a first Doppler shift value or a first Doppler spread value, or both, associated with the first transmission reception point; determining, based at least in part on the received second tracking reference signal, a second Doppler shift value or a second Doppler spread value, or both, associated with the second transmission reception point; and transmitting, to the base station, a report indicating the first Doppler shift value and the second Doppler shift value, or the first Doppler spread value and the second Doppler spread value, or both.

Aspect 9: The method of any of aspects 1 through 8, wherein the quasi co-location relationship comprises an indication that a Doppler shift between the demodulation reference signal and the plurality of tracking reference signals is within a first threshold value, or the quasi co-location relationship comprises an indication that a Doppler spread between the demodulation reference signal and the plurality of tracking reference signals is within a second threshold value, or both.

Aspect 10: The method of aspect 9, wherein the quasi co-location relationship further comprises the Doppler shift, the Doppler spread, an average delay, and a delay spread.

Aspect 11: The method of any of aspects 1 through 10, further comprising: receiving, in the occasion of the data channel, the demodulation reference signal and a data signal; and decoding the received data signal based at least in part on the performing of the channel estimation procedure.

Aspect 12: The method of any of aspects 1 through 11, further comprising: determining a Doppler shift value, or a Doppler spread value, or both, between the received first tracking reference signal and the received second tracking reference signal; and reporting the determined Doppler shift value, or the Doppler spread value, or both, to the base station.

Aspect 13: The method of aspect 12, further comprising: identifying that the determined Doppler shift value exceeds a first threshold, or the determined Doppler spread value exceeds a second threshold, or both, wherein the determined Doppler shift value is reported to the base station based at least in part on the determined Doppler shift value exceeding the first threshold, or the determined Doppler spread value is reported to the base station based at least in part on the determined Doppler spread value exceeding the second threshold, or both.

Aspect 14: The method of any of aspects 1 through 13, wherein the first transmission reception point and the second transmission reception point are associated with one layer of the data channel, and the demodulation reference signal of the data channel comprises one demodulation reference signal port.

Aspect 15: A method for wireless communication at a base station, comprising: transmitting, to a UE, an indication of a quasi co-location relationship indicating a relationship between a plurality of tracking reference signals and a demodulation reference signal of a data channel, the plurality of tracking reference signals comprising at least a first tracking reference signal and a second tracking reference signal; transmitting, from a first transmission reception point of the base station, the first tracking reference signal and the demodulation reference signal of the data channel; and transmitting, from a second transmission reception point of the base station, the second tracking reference signal and the demodulation reference signal of the data channel.

Aspect 16: The method of aspect 15, wherein the demodulation reference signal is transmitted as a single frequency network transmission from the first transmission reception point and the second transmission reception point.

Aspect 17: The method of any of aspects 15 through 16, further comprising: transmitting a data signal on an occasion of the data channel as a single frequency network transmission from the first transmission reception point and the second transmission reception point.

Aspect 18: The method of any of aspects 15 through 17, wherein the indication of the quasi co-location relationship comprises an indication of whether the plurality of tracking reference signals are to be pre-compensated by the base station.

Aspect 19: The method of aspect 18, wherein the indicated pre-compensation of the plurality of tracking reference signals comprises a Doppler shift pre-compensation, or a Doppler spread pre-compensation, or both, for the first transmission reception point and the second transmission reception point.

Aspect 20: The method of any of aspects 15 through 19, wherein transmitting the indication of the quasi co-location relationship comprises: transmitting the indication in a tracking reference signal configuration, the tracking reference signal configuration indicating at least a first set of resources for the first tracking reference signal and a second set of resources for the second tracking reference signal.

Aspect 21: The method of any of aspects 15 through 20, further comprising: receiving, from the UE, a report indicating a Doppler shift value or a Doppler spread value, or both, between the first tracking reference signal and the second tracking reference signal.

Aspect 22: The method of any of aspects 15 through 21, further comprising: transmitting, to the UE, a configuration for the UE to use to receive the plurality of tracking reference signals from a plurality of transmission reception points, including at least the first transmission reception point and the second transmission reception point.

Aspect 23: The method of any of aspects 15 through 22, wherein the first transmission reception point and the second transmission reception point are associated one single layer of the data channel and the demodulation reference signal of the data channel comprises one demodulation reference signal port.

Aspect 24: An apparatus for wireless communication at a UE, comprising a processor; memory coupled with the processor; and instructions stored in the memory and executable by the processor to cause the apparatus to perform a method of any of aspects 1 through 14.

Aspect 25: An apparatus for wireless communication at a UE, comprising at least one means for performing a method of any of aspects 1 through 14.

Aspect 26: A non-transitory computer-readable medium storing code for wireless communication at a UE, the code comprising instructions executable by a processor to perform a method of any of aspects 1 through 14.

Aspect 27: An apparatus for wireless communication at a base station, comprising a processor; memory coupled with the processor; and instructions stored in the memory and executable by the processor to cause the apparatus to perform a method of any of aspects 15 through 23.

Aspect 28: An apparatus for wireless communication at a base station, comprising at least one means for performing a method of any of aspects 15 through 23.

Aspect 29: A non-transitory computer-readable medium storing code for wireless communication at a base station, the code comprising instructions executable by a processor to perform a method of any of aspects 15 through 23.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving, from a base station, an indication of a quasi co-location relationship indicating a relationship between a plurality of tracking reference signals and a single demodulation reference signal port of the UE that corresponds to a demodulation reference signal of a data channel, the plurality of tracking reference signals comprising at least a first tracking reference signal and a second tracking reference signal;
   receiving, from a first transmission reception point, the first tracking reference signal associated with an occasion of the data channel, the first tracking reference signal pre-compensated by a Doppler shift pre-compensation, or a Doppler spread pre-compensation, or both based at least in part on the indication of the quasi co-location relationship;

receiving, from a second transmission reception point, the second tracking reference signal associated with the occasion of the data channel, wherein the first tracking reference signal from the first transmission reception point and the second tracking reference signal from the second transmission reception point are associated with a single layer of the data channel; and performing, based at least in part on the indication of the quasi co-location relationship, a channel estimation procedure for the data channel based at least in part on the demodulation reference signal, the received first tracking reference signal, and the received second tracking reference signal.

2. The method of claim 1, wherein the occasion of the data channel is for a single frequency network transmission of the data channel further comprises the demodulation reference signal from the first transmission reception point and the second transmission reception point.

3. The method of claim 1, wherein the indication of the quasi co-location relationship comprises an indication of whether the plurality of tracking reference signals are to be pre-compensated by the base station.

4. The method of claim 3, wherein the indicated pre-compensation of the plurality of tracking reference signals comprises an indication of the Doppler shift pre-compensation, or the Doppler spread pre-compensation, or both, for the first transmission reception point and the second transmission reception point.

5. The method of claim 1, wherein receiving the indication of the quasi co-location relationship comprises:

receiving the indication in a tracking reference signal configuration, the tracking reference signal configuration indicating at least a first set of resources for the first tracking reference signal and a second set of resources for the second tracking reference signal.

6. The method of claim 5, wherein the indication in the tracking reference signal configuration comprises an information element that indicates whether the plurality of tracking reference signals are to be pre-compensated by the base station.

7. The method of claim 1, wherein the indication of the quasi co-location relationship comprises a field that indicates whether the plurality of tracking reference signals are to be pre-compensated by the base station.

8. The method of claim 1, further comprising:

determining, based at least in part on the received first tracking reference signal, a first Doppler shift value or a first Doppler spread value, or both, associated with the first transmission reception point;

determining, based at least in part on the received second tracking reference signal, a second Doppler shift value or a second Doppler spread value, or both, associated with the second transmission reception point; and transmitting, to the base station, a report indicating the first Doppler shift value and the second Doppler shift value, or the first Doppler spread value and the second Doppler spread value, or both.

9. The method of claim 1, wherein the quasi co-location relationship comprises an indication that a Doppler shift between the demodulation reference signal and the plurality of tracking reference signals is within a first threshold value, or the quasi co-location relationship comprises an indication that a Doppler spread between the demodulation reference signal and the plurality of tracking reference signals is within a second threshold value, or both.

10. The method of claim 9, wherein the quasi co-location relationship further comprises the Doppler shift, the Doppler spread, an average delay, and a delay spread.

11. The method of claim 1, further comprising:

receiving, in the occasion of the data channel, the demodulation reference signal and a data signal; and decoding the received data signal based at least in part on the performing of the channel estimation procedure.

12. The method of claim 1, further comprising:

determining a Doppler shift value, or a Doppler spread value, or both, between the received first tracking reference signal and the received second tracking reference signal; and reporting the determined Doppler shift value, or the determined Doppler spread value, or both, to the base station.

13. The method of claim 12, further comprising:

identifying that the determined Doppler shift value exceeds a first threshold, or the determined Doppler spread value exceeds a second threshold, or both, wherein the determined Doppler shift value is reported to the base station based at least in part on the determined Doppler shift value exceeding the first threshold, or the determined Doppler spread value is reported to the base station based at least in part on the determined Doppler spread value exceeding the second threshold, or both.

14. A method for wireless communication at a base station, comprising:

transmitting, to a user equipment (UE), an indication of a quasi co-location relationship indicating a relationship between a plurality of tracking reference signals and a single demodulation reference signal port of the UE that corresponds to a demodulation reference signal of a data channel, the plurality of tracking reference signals comprising at least a first tracking reference signal and a second tracking reference signal;

transmitting, from a first transmission reception point of the base station, the first tracking reference signal and the demodulation reference signal of the data channel, the first tracking reference signal pre-compensated by a Doppler shift pre-compensation, or a Doppler spread pre-compensation, or both based at least in part on the indication of the quasi co-location relationship; and transmitting, from a second transmission reception point of the base station, the second tracking reference signal and the demodulation reference signal of the data channel, wherein the first tracking reference signal from the first transmission reception point and the second tracking reference signal from the second transmission reception point are associated with a single layer of the data channel.

15. The method of claim 14, wherein the demodulation reference signal is transmitted as a single frequency network transmission from the first transmission reception point and the second transmission reception point.

16. The method of claim 14, further comprising:

transmitting a data signal on an occasion of the data channel as a single frequency network transmission from the first transmission reception point and the second transmission reception point.

17. The method of claim 14, wherein the indication of the quasi co-location relationship comprises an indication of whether the plurality of tracking reference signals are to be pre-compensated by the base station.

18. The method of claim 17, wherein the indicated pre-compensation of the plurality of tracking reference signals comprises an indication of the Doppler shift pre-compensation, or the Doppler spread pre-compensation, or both, for the first transmission reception point and the second transmission reception point.

19. The method of claim 14, wherein transmitting the indication of the quasi co-location relationship comprises:
transmitting the indication in a tracking reference signal configuration, the tracking reference signal configuration indicating at least a first set of resources for the first tracking reference signal and a second set of resources for the second tracking reference signal.

20. The method of claim 14, further comprising:
receiving, from the UE, a report indicating a Doppler shift value or a Doppler spread value, or both, between the first tracking reference signal and the second tracking reference signal.

21. The method of claim 14, further comprising:
transmitting, to the UE, a configuration for the UE to use to receive the plurality of tracking reference signals from a plurality of transmission reception points, including at least the first transmission reception point and the second transmission reception point.

22. The method of claim 14, wherein the first transmission reception point and the second transmission reception point are associated one single layer of the data channel and the demodulation reference signal of the data channel comprises one demodulation reference signal port.

23. An apparatus for wireless communication at a user equipment (UE), comprising:
one or more processors,
memory coupled with the one or more processors; and
instructions stored in the memory and executable by the one or more processors to cause the apparatus to:
receive, from a base station, an indication of a quasi co-location relationship indicating a relationship between a plurality of tracking reference signals and a single demodulation reference signal port of the UE that corresponds to a demodulation reference signal of a data channel, the plurality of tracking reference signals comprising at least a first tracking reference signal and a second tracking reference signal;
receive the demodulation reference signal in the data channel;
receive, from a first transmission reception point, the first tracking reference signal associated with an occasion of the data channel, the first tracking reference signal pre-compensated by a Doppler shift pre-compensation, or a Doppler spread pre-compensation, or both based at least in part on the indication of the quasi co-location relationship;
receive, from a second transmission reception point, the second tracking reference signal associated with the occasion of the data, wherein the first tracking reference signal from the first transmission reception point and the second tracking reference signal from the second transmission reception point are associated with a single layer of the data channel; and
perform, based at least in part on the indication of the quasi co-location relationship, a channel estimation procedure for the data channel based at least in part on the demodulation reference signal, the received first tracking reference signal, and the received second tracking reference signal.

24. The apparatus of claim 23, wherein the occasion of the data channel is a single frequency network transmission of the data channel that comprises the demodulation reference signal from the first transmission reception point and the second transmission reception point.

25. The apparatus of claim 23, wherein the indication of the quasi co-location relationship comprises an indication of whether the plurality of tracking reference signals are to be pre-compensated by the base station.

26. The apparatus of claim 25, wherein the indicated pre-compensation of the plurality of tracking reference signals comprises an indication of the Doppler shift pre-compensation, or the Doppler spread pre-compensation, or both, for the first transmission reception point and the second transmission reception point.

27. An apparatus for wireless communication at a base station, comprising:
one or more processors,
memory coupled with the one or more processors; and
instructions stored in the memory and executable by the one or more processors to cause the apparatus to:
transmit, to a user equipment (UE), an indication of a quasi co-location relationship indicating a relationship between a plurality of tracking reference signals and a single demodulation reference signal port of the UE that corresponds to a demodulation reference signal of a data channel, the plurality of tracking reference signals comprising at least a first tracking reference signal and a second tracking reference signal;
transmit, from a first transmission reception point of the base station, the first tracking reference signal and the demodulation reference signal of the data channel, the first tracking reference signal pre-compensated by a Doppler shift pre-compensation, or a Doppler spread pre-compensation, or both based at least in part on the indication of the quasi co-location relationship; and
transmit, from a second transmission reception point of the base station, the second tracking reference signal and the demodulation reference signal of the data channel, wherein the first tracking reference signal from the first transmission reception point and the second tracking reference signal from the second transmission reception point are associated with a single layer of the data channel.

28. The apparatus of claim 27, wherein the demodulation reference signal is transmitted as a single frequency network transmission from the first transmission reception point and the second transmission reception point.

29. The apparatus of claim 27, wherein the indication of the quasi co-location relationship comprises an indication of whether the plurality of tracking reference signals are to be pre-compensated by the base station.

* * * * *